(12) United States Patent
Ning

(10) Patent No.: US 11,181,725 B1
(45) Date of Patent: Nov. 23, 2021

(54) WIDE-ANGLE HYPERSPECTRAL LENSES

(71) Applicant: Alex Ning, Carlsbad, CA (US)

(72) Inventor: Alex Ning, Carlsbad, CA (US)

( * ) Notice: Subject to any disclaimer, the term of this patent is extended or adjusted under 35 U.S.C. 154(b) by 187 days.

(21) Appl. No.: 16/676,321

(22) Filed: Nov. 6, 2019

Related U.S. Application Data

(60) Provisional application No. 62/757,803, filed on Nov. 9, 2018, provisional application No. 62/810,811, filed on Feb. 26, 2019.

(51) Int. Cl.
| | | |
|---|---|---|
| *G02B 15/14* | (2006.01) | |
| *G02B 7/02* | (2021.01) | |
| *G02B 9/12* | (2006.01) | |
| *G02B 13/00* | (2006.01) | |

(52) U.S. Cl.
CPC ....... *G02B 15/143507* (2019.08); *G02B 7/02* (2013.01); *G02B 9/12* (2013.01); *G02B 13/0045* (2013.01); *G02B 13/0035* (2013.01)

(58) Field of Classification Search
CPC ... G02B 9/12; G02B 9/62; G02B 9/64; G02B 15/143507; G02B 13/002; G02B 13/0035; G02B 13/0045
USPC .......................................................... 359/784
See application file for complete search history.

(56) References Cited

U.S. PATENT DOCUMENTS

| | | | |
|---|---|---|---|
| 4,329,024 A | 5/1982 | Rogers | |
| 7,023,628 B1 | 4/2006 | Ning | |
| 7,929,221 B2 | 4/2011 | Ning | |
| 7,940,478 B2 | 5/2011 | Take | |
| 8,503,110 B2 | 8/2013 | Oshita | |
| 8,659,841 B2 | 2/2014 | Enomoto | |
| 8,964,312 B2 | 2/2015 | Kawamura | |
| 10,437,021 B1 | 10/2019 | Ning | |
| 2011/0115963 A1 | 5/2011 | Sueyoshi | |
| 2015/0205080 A1 | 7/2015 | Yokoyama | |
| 2017/0307857 A1* | 10/2017 | Ning | G02B 9/62 |
| 2021/0088756 A1* | 3/2021 | Saotome | G02B 13/04 |

* cited by examiner

*Primary Examiner* — Kristina M Deherrera
(74) *Attorney, Agent, or Firm* — Mark Wisnosky

(57) ABSTRACT

Wide-angle optical imaging lenses designed to have a wide field of view, stability in optical properties over temperature excursions, and, low chromatic aberrations are described. The lenses are comprised of three lens groups. A first group (counting from the object side) having a negative refractive power comprises two negatively powered elements. The first element has a meniscus shape with a convex object surface. The second lens element has a concave image surface and in preferred embodiments is aspherical. The second group having a positive power comprising two elements. Both elements having positive power. The image surface of the first element in the $2^{nd}$ group and the object surface of the $2^{nd}$ element in the $2^{nd}$ group are both convex. An aperture stop is located between the second and third lens groups. The third lens group has a positive power and includes a cemented doublet or triplet, and a singlet element. Selected lens elements are aspherical and selected lens elements are formed from an optical material having a negative do/dT coefficient.

18 Claims, 16 Drawing Sheets

WIDE-ANGLE HYPERSPECTRAL LENSES

CROSS-REFERENCE TO RELATED APPLICATIONS

This application claims priority to U.S. Provisional Application 62/757,803, filed Nov. 9, 2018 and U.S. Provisional Application 62/810,811 filed Feb. 26, 2019, both titled Wide-Angle Hyperspectral Lenses, and both by the same inventor.

STATEMENT REGARDING FEDERALLY SPONSORED RESEARCH OR DEVELOPMENT

Not Applicable.

BACKGROUND OF THE INVENTION

Technical Field

The invention relates to wide-angle lenses that have excellent spectral performance.

Related Background Art

Digital imaging cameras use solid-state image sensors such as CCD or CMOS imagers to convert optical images into electronic signals. As the resolution of the imagers increases, there is a continuous need for optical lenses with increased performance. An important characteristic of the lens is the ability to produce high-resolution images across a wide field of view. Another important characteristic is to produce such high-resolution images using a lens that is of a compact size. The lenses are increasing being incorporated into a variety of electronic devices including not only mobile phones, cameras, sports cameras, computers and computer peripherals, but now also surveillance devices, vehicles, drones and other devices where the lenses and associated imaging system are used for real time guidance of vehicles and surveillance analyses. Incorporation of the lenses into new devices places new environmental performance requirements upon the lens. The lens must be compact and light, to be used in portable devices, have a wide field of view, and, must maintain high optical performance characteristics, even in varying environmental conditions such as varying temperature.

Optical systems used, for example, to provide automotive driver assistance and automated piloting of a variety of vehicles have placed new demands on optical lens design. Such optical systems must maintain optical performance in harsh environments where wide temperature excursions can be anticipated. Frequently such systems are fixed focus and require that the image focused on an optical sensor, and thus the back focal length, is maintained over wide temperature excursions.

Ultra wide-angle lenses having field of view >=120 deg are useful for a variety of applications including security cameras and automotive cameras. As the performance of electronic imaging sensor increases there is a need for improved ultra wide-angle lenses capable of providing excellent images in an extended spectral range from 400 nm up to 1000 nm. The objective of this invention is to provide ultra wide-angle lenses capable of providing excellent aberration correction over this extended spectral range. There is a need for compact, wide-angle lenses, for use in optical imaging devices, that have a field of view greater than 120° with low color aberrations across the extended spectrum, and, throughout the environmental range (temperature and humidity) of the imaging device at the time an image is acquired.

BRIEF SUMMARY OF THE INVENTION

The present invention comprises three lens groups and an aperture stop. Each lens group comprises one to several lens elements. Each lens element has two surfaces. The object surface of an element is defined as the surface facing the object space of the lens assembly. In all drawings the object space is on the left side of the lens assembly. The image surface is defined as the lens surface facing the image space of the lens assembly. In all drawings the image space is on the right side of the lens assembly.

1) A first group (counting from the object side) having a negative refractive power comprises two negatively powered elements. The first element has a meniscus shape with a convex object surface. In preferred embodiments the second element is an aspheric element (both surfaces are aspherical) with negative power.
2) A second group having a positive power comprising two elements. Both elements having positive power. The image surface of the first element and the object surface of the $2^{nd}$ element are both convex.
3) An aperture stop
4) A third group having a positive power comprising a cemented doublet or triplet, and a singlet element.

In preferred embodiment the singlet element is an aspherical element having positive power. In another preferred embodiment, both the object surface and the image surface of the singlet element are aspherical. The positive element in the cemented doublet or triplet, and/or, the singlet of group 3, is formed from an optical material having a negative dn/dT coefficient. Where dn/dT is the change in the refractive index with temperature.

An aspheric element is defined as lens element having at least one aspheric surface, which is generally described by the following well-known equation:

$$z(r) = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16} \quad (1)$$

Where the optic axis is in the z-axis and z(r) is the z component of the sag of the surface at distance r from the vertex. The terms $\alpha_i$ describe the deviation of the designed surface from the quadratic surface defined by k, a conic constant, and, c a curvature at the vertex.

In the preferred embodiment:

$$TTL/D < 4 \quad (2)$$

Where TTL is the total track length of the lens and D is the semi-clear aperture of the first element, first surface of Group 1.

DETAILED DESCRIPTION OF THE INVENTION

The invented lenses are exemplified by the following eight examples. Each has been found by the inventor to have excellent optical performance, including excellent lateral color performance.

Each example comprises from object to image:
1) A first group (counting from the object side) having a negative refractive power comprises two negatively powered elements. The first element has a meniscus shape with a convex object surface. In preferred embodiments the second element is a negative power aspheric element, with both image and object surfaces aspherical.
2) A second group having a positive power comprising two elements. Both elements having positive power. The image surface of the first element and the object surface of the 2nd element are both convex.
3) An aperture stop
4) A third group having a positive power comprising a cemented doublet or triplet, and a singlet element. In preferred embodiment the singlet element is an aspherical element having positive power. The positive element in the cemented doublet or triplet and/or the singlet is formed from an optical material having a negative dn/dT coefficient. In the preferred embodiment:

$$TTL/D < 4 \qquad (2)$$

Where TTL is the total track length of the lens and D is the semi-clear aperture of the first element, first (object) surface of Group 1.

Figure 1A:
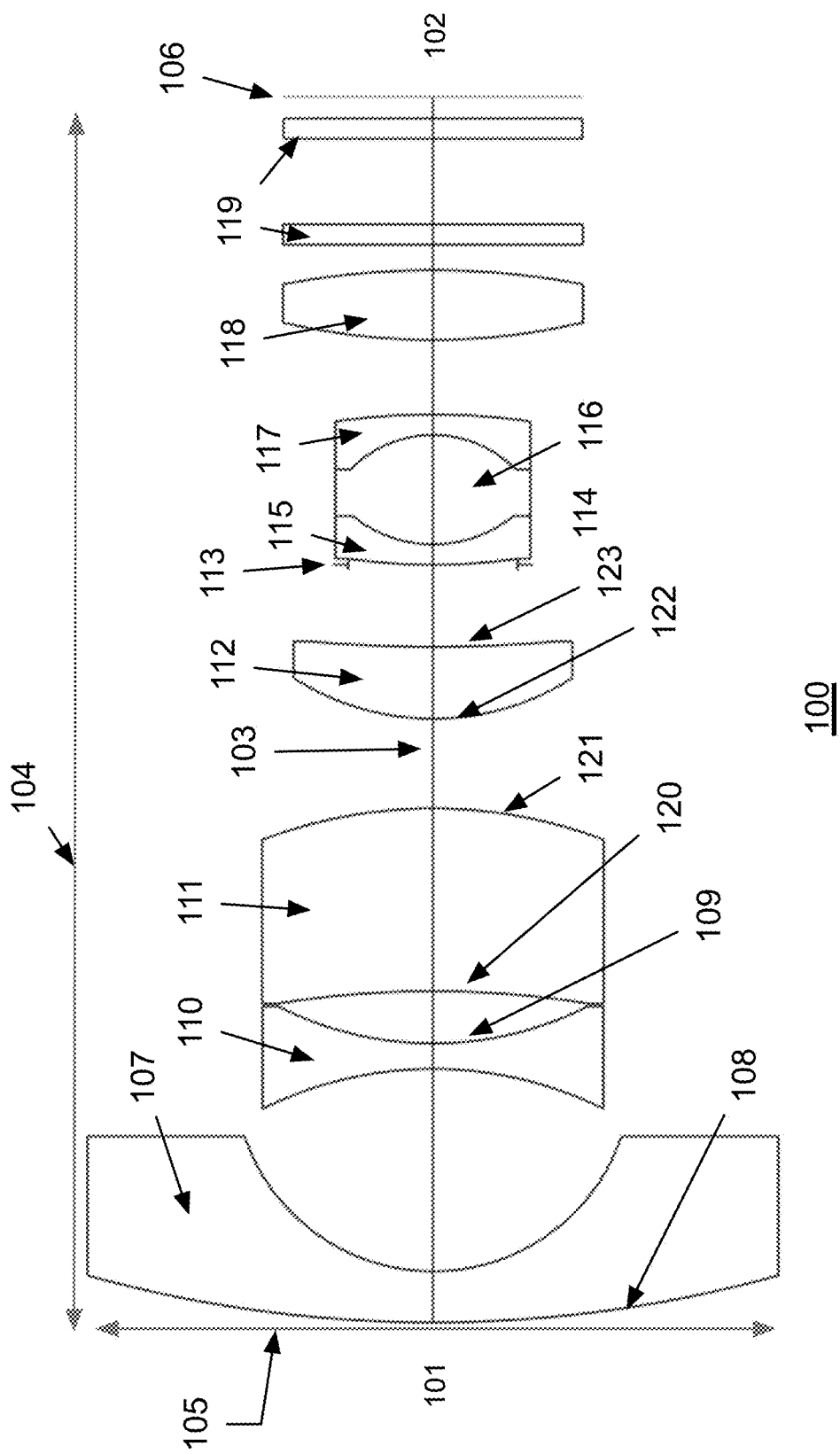
FIG. 1A is a first example embodiment of a wide-angle hyperspectral lens according to the present invention.

FIG. 1A shows a cross-section view of a first embodiment of a wide-angle hyperspectral lens. The lens 100 is comprised, from object 101 to image 102, of three lens groups each symmetrical about the optical axis 103 and distributed along the optical axis. The lens has a total track length (TTL) 104 and a full clear aperture 105. The semi-clear aperture D is half of full clear aperture 105.

Group 1 has negative power and comprises two negative power lens elements 107, 110. The first element 107 has a meniscus shape and a convex object surface 108. The second lens element 110 has negative power and a concave image surface 109. In this embodiment, the second lens element 110, as well as all other lens elements, are spherical.

Group 2 has positive power and is comprised of two positive power lens elements 111, 112. The first lens element 111 of group 2 has a concave object surface 120 and a convex image surface 121. The second lens element 112 of group 2 has a convex object surface 122 and a concave image surface 123. An aperture stop 113 is located between the second lens group 111, 112 and the third lens group 115-118.

The third lens group has positive power comprising a cemented triplet 115, 116, 117 and a singlet element 118. The positive element 116 in the cemented triplet is formed from an optical material having a negative dn/dT coefficient. In this first embodiment the singlet 118 is a spherical lens. The figure further shows optional filters and protective covers 119 before the imaging sensor 106.

The lens 100 has a field angle of +/−75°, and a relative aperture of F/1.8. The value for TTL/D of this lens is 3.6. The optical prescription details of the lens 100 are shown in Table 1.

Table 1, shows for each surface, column labeled Surf, in the lens design of FIG. 1, the type of surface, is either Spherical or Aspherical. The radius is the radius of curvature for each surface, Thickness refers to the distance from the surface to the next surface. Nd and Vd refer to the index of refraction and Abbe number for the material used to make the lens element.

TABLE 1

Optical Prescription for Example 1, FIG. 1A.

| Surf | Type | Radius | Thickness | Nd, Vd | Element of FIG. 1 |
|---|---|---|---|---|---|
| 1 | STANDARD | 25.30646 | 1 | 1.592824, 68.624378 | 107 |
| 2 | STANDARD | 3.901306 | 3.966276 | | |
| 3 | STANDARD | −7.518671 | 0.5 | 1.496998, 81.594687 | 110 |
| 4 | STANDARD | 6.67839 | 1.023143 | | |
| 5 | STANDARD | −19.19199 | 3.581498 | 1.953749, 32.318108 | 111 |
| 6 | STANDARD | −9.3968 | 1.757384 | | |
| 7 | STANDARD | 5.067996 | 1.406803 | 1.910826, 35.255728 | 112 |
| 8 | STANDARD | 26.81461 | 1.609048 | | |
| STO | STANDARD | Infinity | 0 | | |
| 10 | STANDARD | 11.49238 | 0.4 | 1.784721, 25.719658 | 115 |
| 11 | STANDARD | 2.498823 | 2.142895 | 1.592824, 68.624378 | 116 |
| 12 | STANDARD | −2.271465 | 0.4 | 1.805189, 25.477290 | 117 |
| 13 | STANDARD | −13.676 | 1.462472 | | |
| 14 | STANDARD | 12.7669 | 1.366175 | 1.945958, 17.943914 | 118 |

TABLE 1-continued

Optical Prescription for Example 1, FIG. 1A.

| Surf | Type | Radius | Thickness | Nd, Vd | Element of FIG. 1 |
|---|---|---|---|---|---|
| 15 | STANDARD | −15.68506 | 0.5 | | |
| 16 | STANDARD | Infinity | 0.4 | 1.516797, 64.212351 | 119 |
| 17 | STANDARD | Infinity | 1.672733 | | |
| 18 | STANDARD | Infinity | 0.4 | 1.516800, 64.167336 | 119 |
| 19 | STANDARD | Infinity | 0.4295998 | | |
| IMA | STANDARD | Infinity | | | 106 |

Figure 1B:
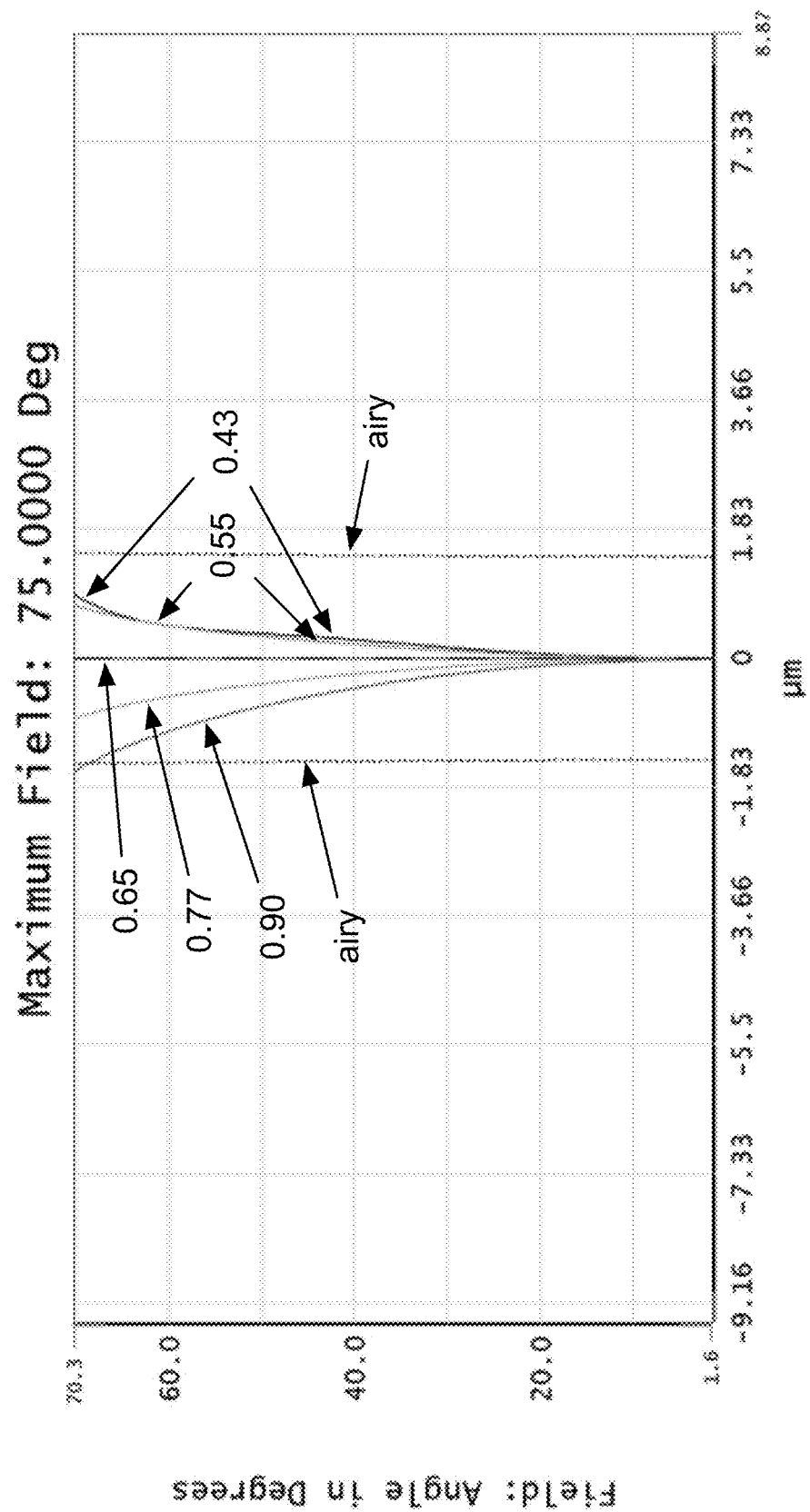
FIG. 1B is a diagram of the lateral color correction of the lens of FIG. 1A.

FIG. 1B shows the lateral color correction. The color correction is shown for various wavelengths of light, as a function of field angle, for the lens 100 of FIG. 1A. Each line is labeled with the wavelength of the light for the color correction, or, is the Airy line as is known in the art.

Figure 2A:
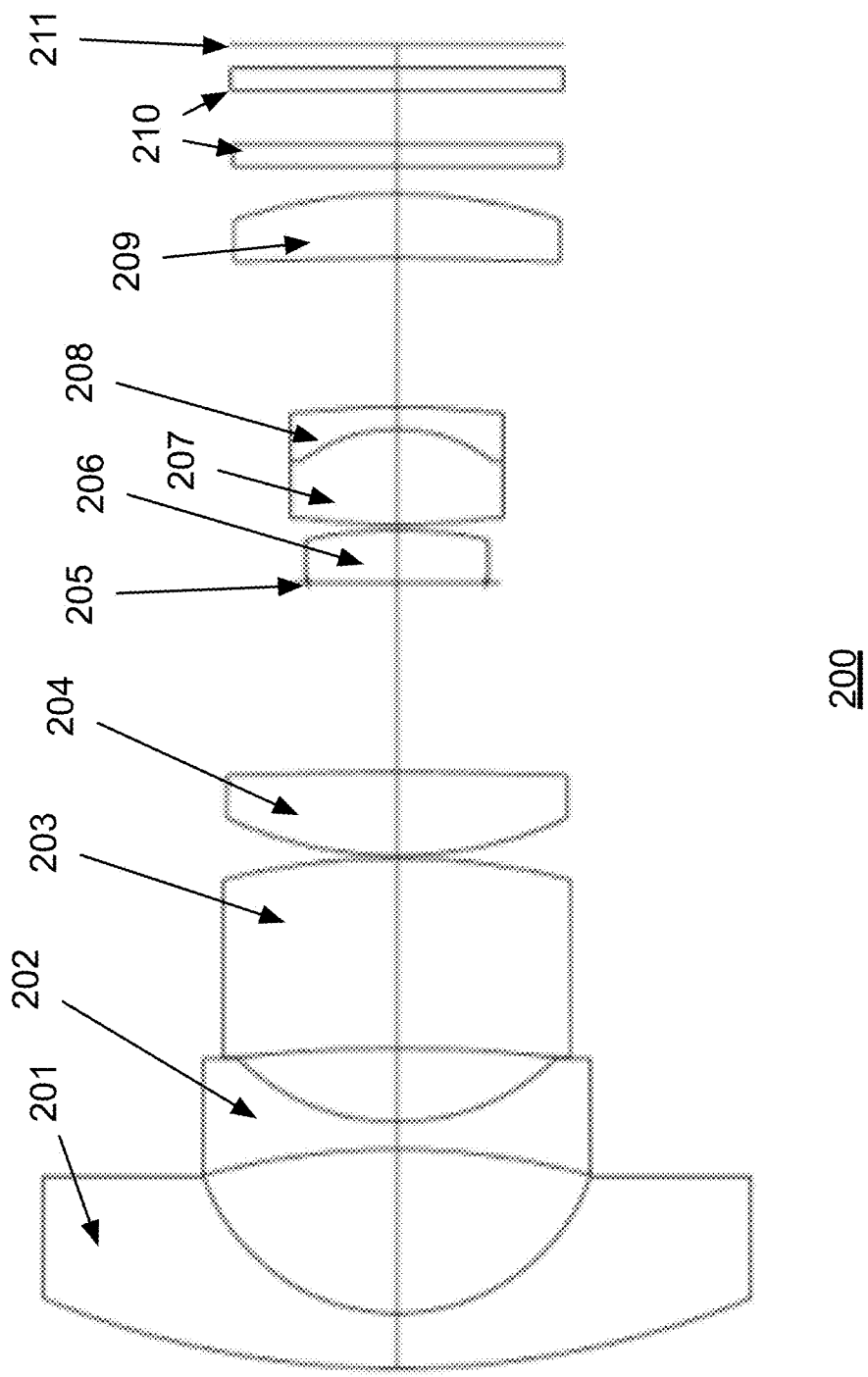
FIG. 2A is a first example embodiment of a wide-angle hyperspectral lens according to the present invention.

FIG. 2A shows a cross-section view of a second embodiment of a wide-angle hyperspectral lens. The lens 200 is comprised, from object to image, of three lens groups each symmetrical about the optical axis and distributed along the optical axis. The lens has a total track length (TTL) and a semi-clear aperture. Note individual surfaces, the optical axis, total track length and clear aperture are not labeled but equivalent to those elements labeled in FIG. 1A.

Group 1 has negative power and comprises two negative power lens elements 201, 202. The first element 201 has a meniscus shape and a convex object surface. The second lens element 202 has negative power and a concave image surface. In this embodiment, the second lens element 202, as well as all other lens elements, are spherical.

Group 2 has positive power and is comprised of two positive power lens elements 203, 204. The first lens element 203 of group 2 has a concave object surface and a convex image surface. The second lens element 204 of group 2 has a convex object surface and a convex image surface. An aperture stop 205 is located between the second lens group 203, 204 and the third lens group 206-209.

The third lens group has positive power comprising a first singlet 206, a cemented doublet 207, 208 and a second singlet element 209. The positive element 207 of the doublet is formed from an optical material having a negative do/dT coefficient. The figure further shows optional filters and protective covers 210 before the imaging sensor 211.

The lens 200 has a field angle of +/−75°, and a relative aperture of F/2.0. The value for TTL/D of this lens is 3.7. The optical prescription details of the lens 200 are shown in Table 2. Explanations of the values included in Table 2 are the same as for Table 1 already described.

TABLE 2

Optical Prescription for lens of FIG. 2A.

| Surf | Type | Radius | Thickness | Nd, Vd | Element of FIG. 2 |
|---|---|---|---|---|---|
| 1 | STANDARD | 16.84919 | 1 | 1.592824, 68.624378 | 201 |
| 2 | STANDARD | 3.737618 | 2.974695 | | |
| 3 | STANDARD | −13.3809 | 0.5 | 1.592824, 68.624378 | 202 |
| 4 | STANDARD | 4.202914 | 1.334423 | | |
| 5 | STANDARD | −25.7436 | 3.447524 | 1.883004, 40.806875 | 203 |
| 6 | STANDARD | −13.058 | 0.050929 | | |
| 7 | STANDARD | 7.331129 | 1.509849 | 1.787998, 47.516598 | 204 |
| 8 | STANDARD | −87.9423 | 3.445016 | | |
| STO | STANDARD | Infinity | 0 | | 205 |
| 10 | STANDARD | Infinity | 0.957416 | 1.592824, 68.624378 | 206 |
| 11 | STANDARD | −7.7793 | 0.1 | | |
| 12 | STANDARD | 12.24503 | 1.730626 | 1.592824, 68.624378 | 207 |
| 13 | STANDARD | −2.89552 | 0.4 | 1.805189, 25.477290 | 208 |
| 14 | STANDARD | −16.1762 | 2.701336 | | |
| 15 | STANDARD | −63.1872 | 1.167938 | 2.000689, 25.435062 | 209 |
| 16 | STANDARD | −9.57375 | 0.5 | | |
| 17 | STANDARD | Infinity | 0.4 | 1.516797, 64.212351 | 210 |
| 18 | STANDARD | Infinity | 0.98619 | | |
| 19 | STANDARD | Infinity | 0.4 | 1.516800, 64.167336 | 210 |
| 20 | STANDARD | Infinity | 0.4296 | | |
| IMA | STANDARD | Infinity | | | 211 |

Figure 2B:
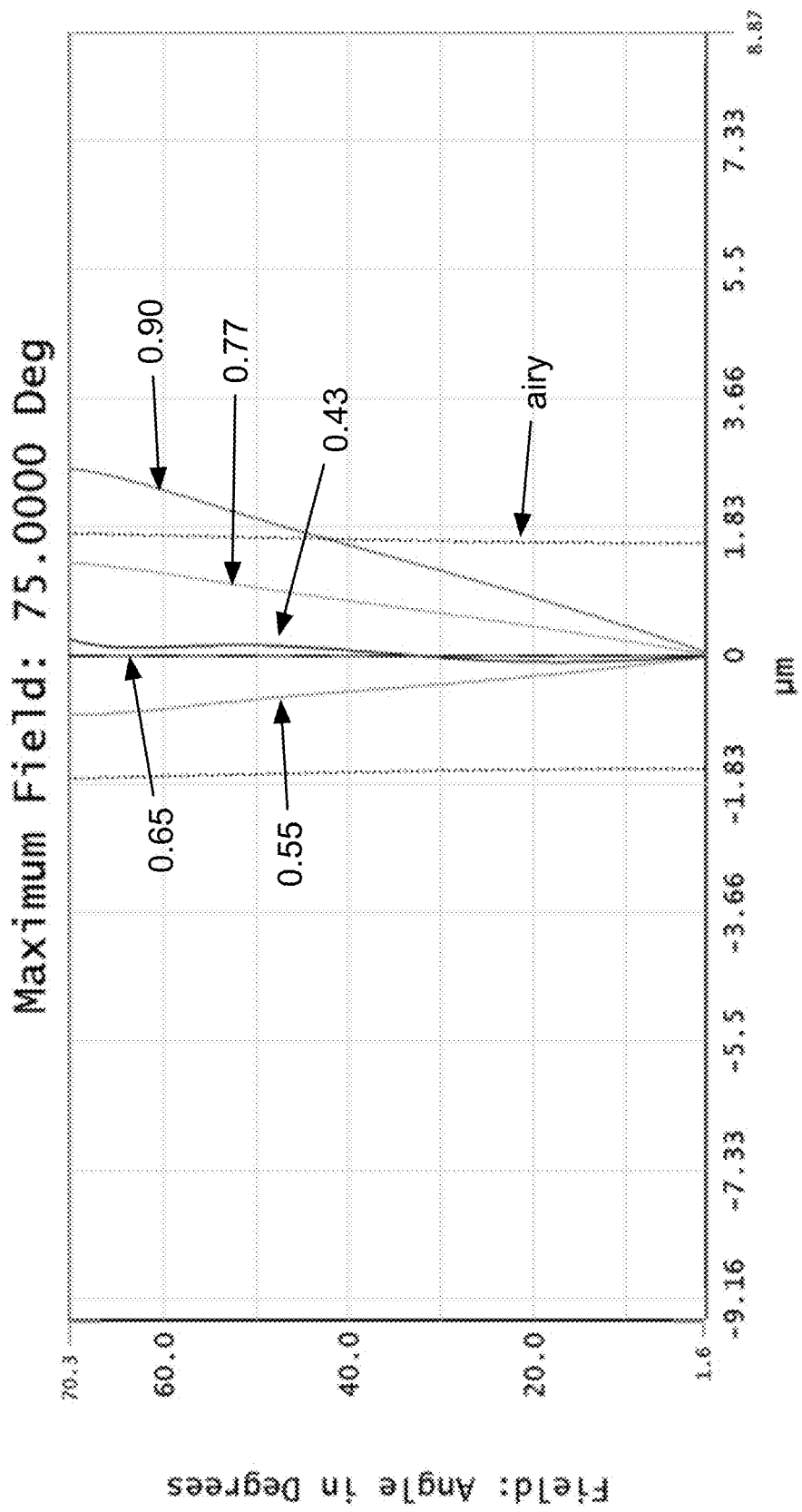
FIG. 2B is a diagram of the lateral color correction of the lens of FIG. 1A.

FIG. 2B shows the lateral color correction. The color correction is shown for various wavelengths of light, as a function of field angle, for the lens 200 of FIG. 2A. The format of FIG. 2B is the same as for FIG. 1B. Each line is labeled with the wavelength of the light for the color correction, or, is the Airy line as is known in the art.

Figure 3A:
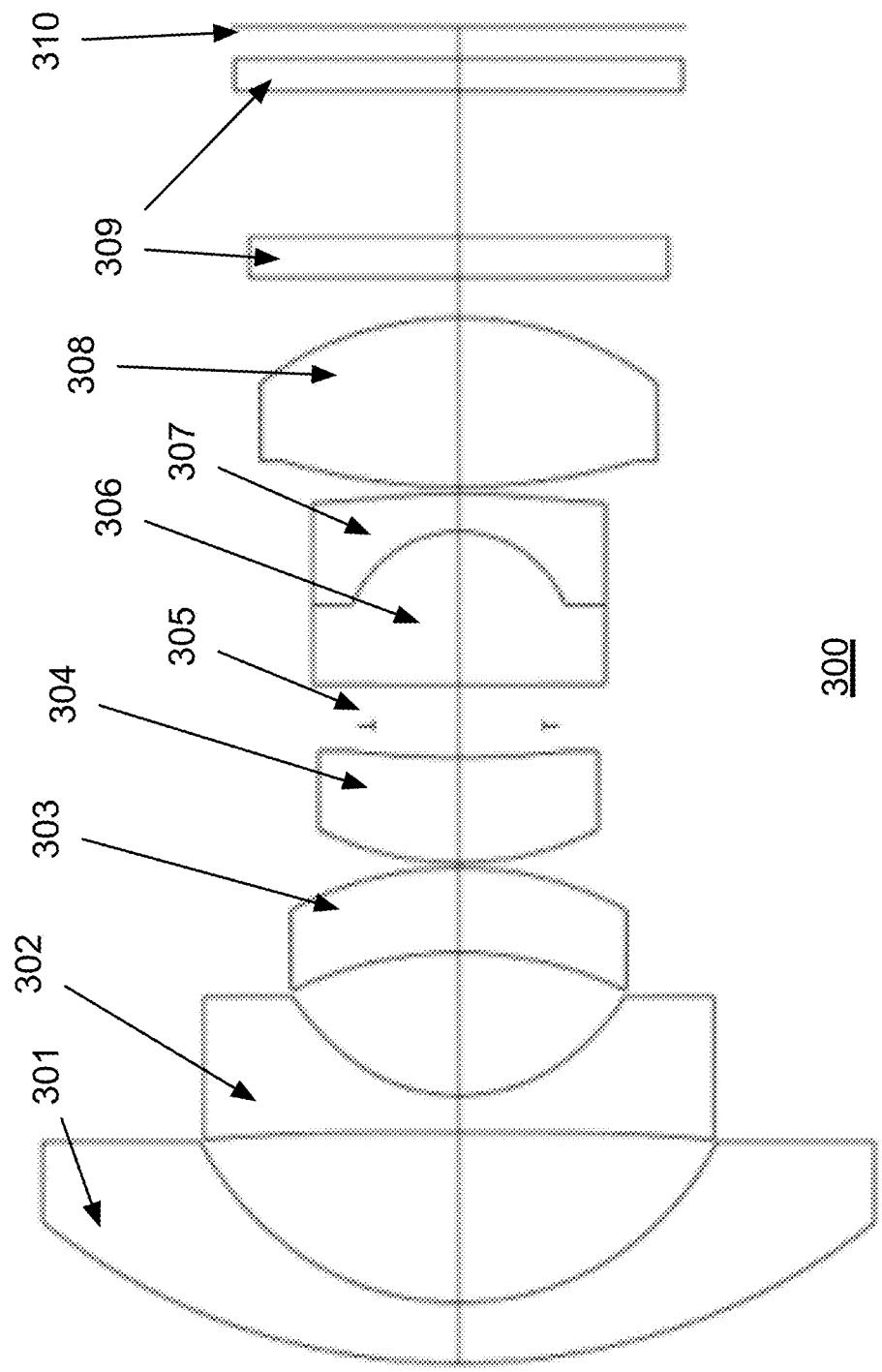
FIG. 3A is a first example embodiment of a wide-angle hyperspectral lens according to the present invention.

FIG. 3A shows a cross-section view of a third embodiment of a wide-angle hyperspectral lens. The lens 300 is comprised, from object to image, of three lens groups each symmetrical about the optical axis and distributed along the optical axis. The lens has a total track length (TTL) and a semi-clear aperture. Note individual surfaces, the optical axis, total track length and clear aperture are not labeled but equivalent to those elements labeled in FIG. 1A.

Group 1 has negative power and comprises two negative power lens elements 301, 302. The first element 301 has a meniscus shape and a convex object surface. The second lens element 302 has negative power and a concave image surface. In this embodiment, the second lens element 302 has an aspherical object surface and a spherical image surface.

Group 2 has positive power and is comprised of two positive power lens elements 303, 304. The first lens element 303 of group 2 has a concave object surface and a convex image surface. The second lens element 304 of group 2 has a convex object surface and a concave image surface. An aperture stop 305 is located between the second lens group 303, 304 and the third lens group 306-308.

The third lens group has positive power comprising a cemented doublet 306, 307 and a singlet element 308. The positive element 306 of the doublet and the singlet 308 are both formed from an optical material having a negative do/dT coefficient. The object surface of the positive element 306 of the doublet, the image surface of the second lens element 307 of the doublet, and, both surfaces of the single lens element 308, all in group 3 are aspherical. The figure further shows optional filters and protective covers 309 before the imaging sensor 310.

The lens 300 has a field angle of +/−80°, and a relative aperture of F/2.2. The value for TTI/D of this lens is 3.2. The optical prescription details of the lens 300 are shown in Tables 3A and 3B. Explanations of the values included in Table 3A are the same as for Table 1 already described.

TABLE 3A

Optical Prescription for the lens of FIG. 3A.

| Surf | Type | Radius | Thickness | Nd, Vd | Elements of FIG. 3A |
|---|---|---|---|---|---|
| OBJ | STANDARD | Infinity | Infinity | | |
| 1 | STANDARD | 8.481809 | 0.75 | 1.592824, 68.624378 | 301 |
| 2 | STANDARD | 3.559291 | 2.105012 | | |
| 3 | EVENASPH | −1922.87 | 0.456445 | 1.544096, 56.111765 | 302 |
| 4 | STANDARD | 2.14301 | 1.767273 | | |
| 5 | STANDARD | −4.78466 | 1.051904 | 1.677903, 55.559699 | 303 |
| 6 | STANDARD | −4.37949 | 0.061549 | | |
| 7 | STANDARD | 3.843093 | 1.304756 | 1.953749, 32.318108 | 304 |
| 8 | STANDARD | 12.59127 | 0.394383 | | |
| STO | STANDARD | Infinity | 0.505209 | | 305 |
| 10 | EVENASPH | −72.6292 | 1.893006 | 1.544096, 56.111765 | 306 |
| 11 | STANDARD | −1.41067 | 0.474508 | 1.639719, 23.522207 | 307 |
| 12 | EVENASPH | −7.46424 | 0.078743 | | |
| 13 | EVENASPH | 7.374303 | 2.089149 | 1.544096, 56.111765 | 308 |
| 14 | EVENASPH | −4.24987 | 0.5 | | |
| 15 | STANDARD | Infinity | 0.5 | 1.516797, 64.212351 | 309 |
| 16 | STANDARD | Infinity | 1.806664 | | |
| 17 | STANDARD | Infinity | 0.4 | 1.516800, 64.167336 | 309 |
| 18 | STANDARD | Infinity | 0.4 | | |
| IMA | STANDARD | Infinity | | | 310 |

Lens elements 302, 306, 307 and 308 are all aspherical elements with at least one aspherical surface described by Equation 1. The aspherical coefficients of these surfaces are described by Table 3B.

TABLE 3B

Aspheric Coefficients for Lens of FIG. 3A

| Coefficient | Surface 3, Object Surface of Lens Element 302 | Surface 10, Object Surface of lens Element 306 | Surface 12, Image Surface of Lens Element 307 |
|---|---|---|---|
| $\alpha_1$ | 0 | 0 | 0 |
| $\alpha_2$ | −0.0012059937 | 0.0066276215 | 0.007991585 |
| $\alpha_3$ | 3.4083816e−05 | −0.0020424548 | 0.00077466005 |
| $\alpha_4$ | 0 | 0.0021243759 | −6.1965989e−05 |
| $\alpha_5$ | 0 | 0 | 0 |
| $\alpha_6$ | 0 | 0 | 0 |
| $\alpha_7$ | 0 | 0 | 0 |
| $\alpha_8$ | 0 | 0 | 0 |

| Coefficient | Surface 13, Object Surface of Lens Element 308 | Surface 14, Object Surface of lens Element 308 |
|---|---|---|
| $\alpha_1$ | 0 | 0 |
| $\alpha_2$ | −1.7235297e−05 | −0.00045329855 |
| $\alpha_3$ | −0.00010875857 | −2.304918e−05 |
| $\alpha_4$ | 0 | −3.7621535e−06 |
| $\alpha_5$ | 0 | 0 |

TABLE 3B-continued

Aspheric Coefficients for Lens of FIG. 3A

| | | |
|---|---|---|
| $\alpha_6$ | 0 | 0 |
| $\alpha_7$ | 0 | 0 |
| $\alpha_8$ | 0 | 0 |

Figure 3B:
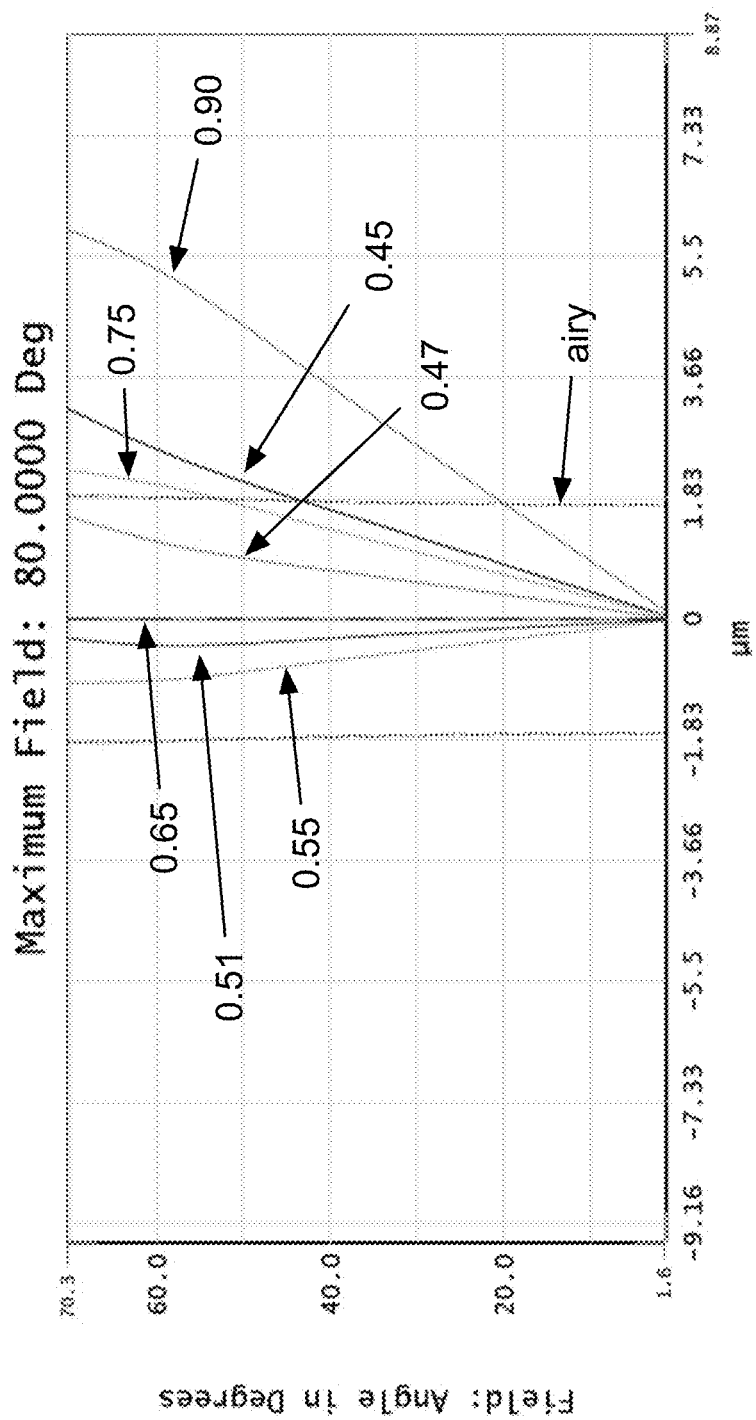
FIG. 3B is a diagram of the lateral color correction of the lens of FIG. 1A.

FIG. 3B shows the lateral color correction. The color correction is shown for various wavelengths of light, as a function of field angle, for the lens 300 of FIG. 3A. The format of FIG. 3B is the same as for FIG. 1B. Each line is labeled with the wavelength of the light for the color correction, or, is the Airy line as are known in the art.

Figure 4A:
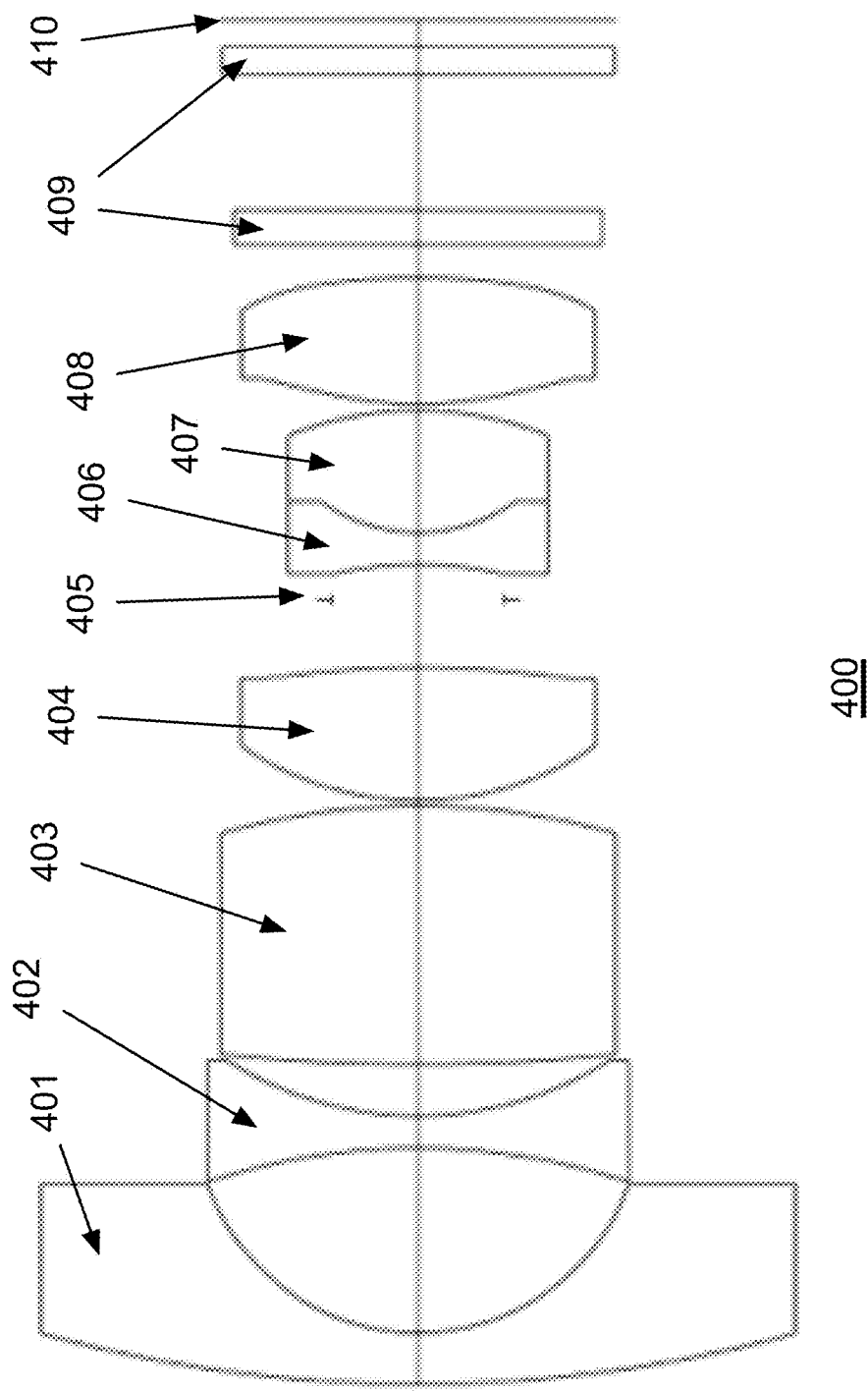
FIG. 4A is a first example embodiment of a wide-angle hyperspectral lens according to the present invention.

FIG. 4A shows a cross-section view of a fourth embodiment of a wide-angle hyperspectral lens. The lens 400 is comprised, from object to image, of three lens groups each symmetrical about the optical axis and distributed along the optical axis. The lens has a total track length (TTL) and a semi-clear aperture. Note individual surfaces, the optical axis, total track length and clear aperture are not labeled but equivalent to those elements labeled in FIG. 1A.

Group 1 has negative power and comprises two negative power lens elements 401, 402. The first element 401 has a meniscus shape and a convex object surface. The second lens element 402 has negative power and a concave image surface. In this embodiment, the second lens element 402 is a spherical lens.

Group 2 has positive power and is comprised of two positive power lens elements 403, 404. The first lens element 403 of group 2 has a convex object surface and a convex image surface. The second lens element 404 of group 2 has a convex object surface and a convex image surface. An aperture stop 405 is located between the second lens group 403, 404 and the third lens group 406-408.

The third lens group has positive power comprising a cemented doublet 406, 407 and a singlet element 408. The second element 407 of the doublet and the singlet 408 are both formed from an optical material having a negative do/dT coefficient. Both surfaces of the single lens element 408 are aspherical. The figure further shows optional filters and protective covers 409 before the imaging sensor 410.

The lens 400 has a field angle of +/−83°, and a relative aperture of F/2. The value for TTL/D of this lens is 3.6.

The optical prescription details of the lens 400 are shown in Tables 4A and 4B. Explanations of the values included in the tables are the same as already described.

TABLE 4A

Optical Prescription for the lens of FIG. 4A.

| Surf | Type | Radius | Thickness | Nd, Vd | Elements of FIG. 4A |
|---|---|---|---|---|---|
| OBJ | STANDARD | Infinity | Infinity | | |
| 1 | STANDARD | 20.9787 | 0.75 | 1.744004, 44.904207 | 401 |
| 2 | STANDARD | 3.285284 | 2.713486 | | |
| 3 | STANDARD | −9.885897 | 0.4738494 | 1.592824, 68.624378 | 402 |
| 4 | STANDARD | 5.236517 | 0.7592244 | | |
| 5 | STANDARD | 31.17911 | 3.787627 | 1.953749, 32.318108 | 403 |
| 6 | STANDARD | −10.59222 | 0.07999689 | | |
| 7 | STANDARD | 4.610838 | 1.947996 | 1.620412, 60.373876 | 404 |
| 8 | STANDARD | −16.01908 | 0.9979571 | | |
| STO | STANDARD | Infinity | 0.5138316 | | 405 |
| 10 | STANDARD | −5.949821 | 0.4758656 | 1.717361, 29.509994 | 406 |
| 11 | STANDARD | 2.482619 | 1.788666 | 1.592824, 68.624378 | 407 |
| 12 | STANDARD | −5.108979 | 0.09129807 | | |
| 13 | EVENASPH | 5.353759 | 1.848119 | 1.497103, 81.559580 | 408 |
| 14 | EVENASPH | −14.35528 | 0.5 | | |
| 15 | STANDARD | Infinity | 0.5 | 1.516797, 64.212351 | 409 |
| 16 | STANDARD | Infinity | 1.995717 | | |
| 17 | STANDARD | Infinity | 0.4 | 1.516800, 64.167336 | 409 |
| 18 | STANDARD | Infinity | 0.4 | | |
| IMA | STANDARD | Infinity | | | 410 |

Both surfaces of lens element 408 are aspherical, described by Equation 1. The aspherical coefficients of these surfaces are described by Table 4B.

TABLE 4B

Aspheric Coefficients for Lens of FIG. 4A

| Coefficient | Surface 13, Object Surface of Lens Element 408 | Surface 14, Image Surface of lens Element 408 |
|---|---|---|
| $\alpha_1$ | 0 | 0 |
| $\alpha_2$ | −0.0056505069 | −0.0036655304 |
| $\alpha_3$ | −0.0001661895 | −0.00024789385 |
| $\alpha_4$ | 0 | 6.9229014e−07 |
| $\alpha_5$ | 0 | 0 |
| $\alpha_6$ | 0 | 0 |
| $\alpha_7$ | 0 | 0 |
| $\alpha_8$ | 0 | 0 |

Figure 4B:
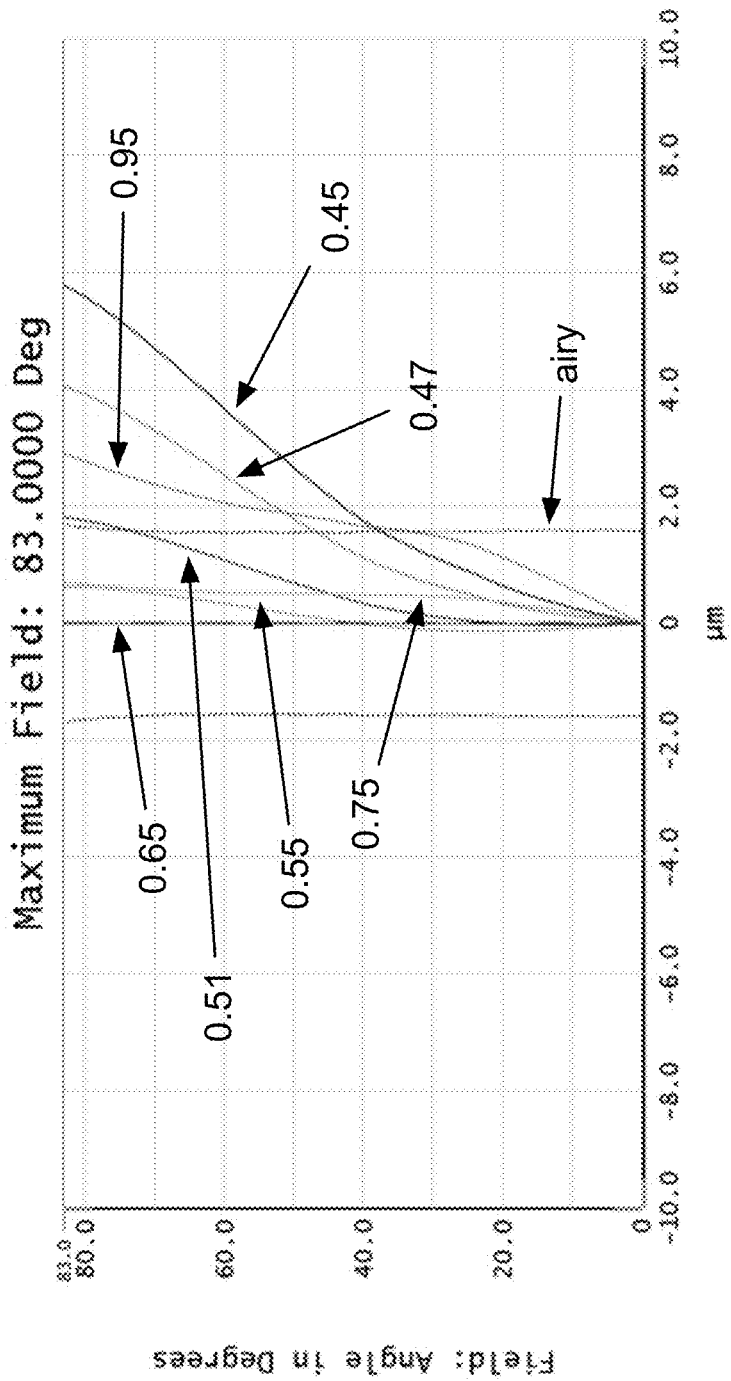
FIG. 4B is a diagram of the lateral color correction of the lens of FIG. 1A.

FIG. 4B shows the lateral color correction. The color correction is shown for various wavelengths of light, as a function of field angle, for the lens 400 of FIG. 4A. The format of FIG. 4B is the same as for FIG. 1B. Each line is labeled with the wavelength of the light for the color correction, or, is the Airy line as are known in the art.

Figure 5A:
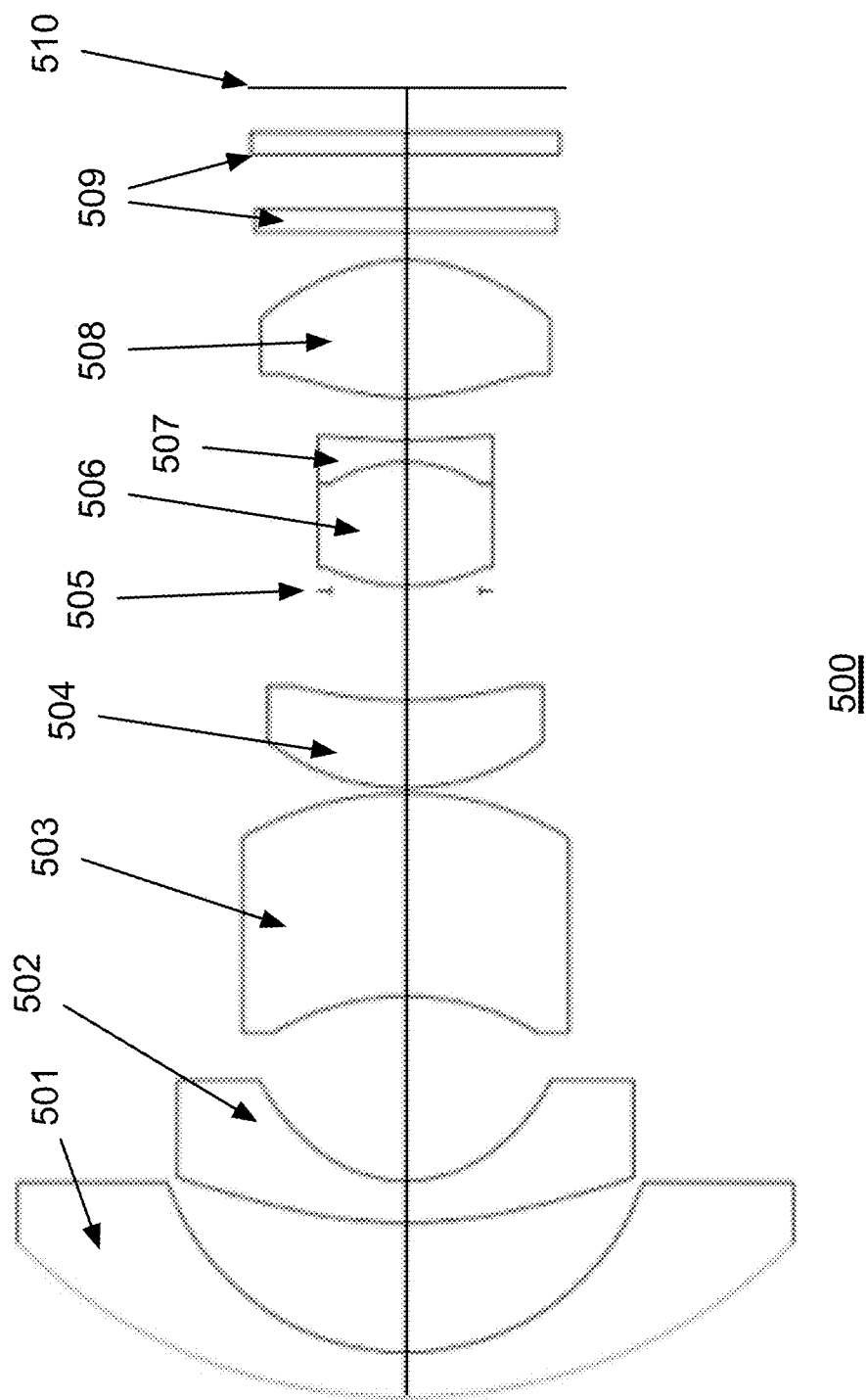
FIG. 5A is a first example embodiment of a wide-angle hyperspectral lens according to the present invention.

FIG. 5A shows a cross-section view of a fifth embodiment of a wide-angle hyperspectral lens. The lens 500 is comprised, from object to image, of three lens groups each symmetrical about the optical axis and distributed along the optical axis. The lens has a total track length (TTL) and a semi-clear aperture. Note individual surfaces, the optical axis, total track length and clear aperture are not labeled but equivalent to those elements labeled in FIG. 1A.

Group 1 has negative power and comprises two negative power lens elements 501, 502. The first element 501 has a meniscus shape and a convex object surface. The second lens element 502 has negative power and a concave image surface. In this embodiment, both surfaces of the second lens element 502 are aspherical.

Group 2 has positive power and is comprised of two positive power lens elements 503, 504. The first lens element 503 of group 2 has a concave object surface and a convex image surface. The second lens element 504 of group 2 has a convex object surface and a concave image surface. An aperture stop 505 is located between the second lens group 503, 504 and the third lens group 506-508.

The third lens group has positive power comprising a cemented doublet 506, 507 and a singlet element 508. The first element 506 of the doublet and the singlet 508 are both formed from an optical material having a negative do/dT coefficient. Both surfaces of the single lens element 508 are aspherical. The figure further shows optional filters and protective covers 509 before the imaging sensor 510.

The lens 500 has a field angle of +/−98°, and a relative aperture of F/2. The value for TTL/D of this lens is 3.1.

The optical prescription details of the lens 500 are shown in Tables 5A and 5B. Explanations of the values included in the tables are the same as already described.

TABLE 5B

Aspheric Coefficients for Lens of FIG. 5A

| Coefficient | Surface 3, Object Surface of Lens Element 502 | Surface 4, Image Surface of lens Element 502 |
|---|---|---|
| $\alpha_1$ | 0 | 0 |
| $\alpha_2$ | −0.00094907367 | −0.00053704851 |
| $\alpha_3$ | 0 | 0 |
| $\alpha_4$ | 0 | 0 |
| $\alpha_5$ | 0 | 0 |
| $\alpha_6$ | 0 | 0 |
| $\alpha_7$ | 0 | 0 |
| $\alpha_8$ | 0 | 0 |

| Coefficient | Surface 13, Object Surface of Lens Element 508 | Surface 14, Image Surface of lens Element 508 |
|---|---|---|
| $\alpha_1$ | 0 | 0 |
| $\alpha_2$ | −0.011328159 | 0.0073202688 |
| $\alpha_3$ | 0.00096800073 | −7.5709607e−05 |
| $\alpha_4$ | −0.00010915676 | 3.4357416e−05 |
| $\alpha_5$ | 0 | 0 |
| $\alpha_6$ | 0 | 0 |
| $\alpha_7$ | 0 | 0 |
| $\alpha_8$ | 0 | 0 |

Figure 5B:
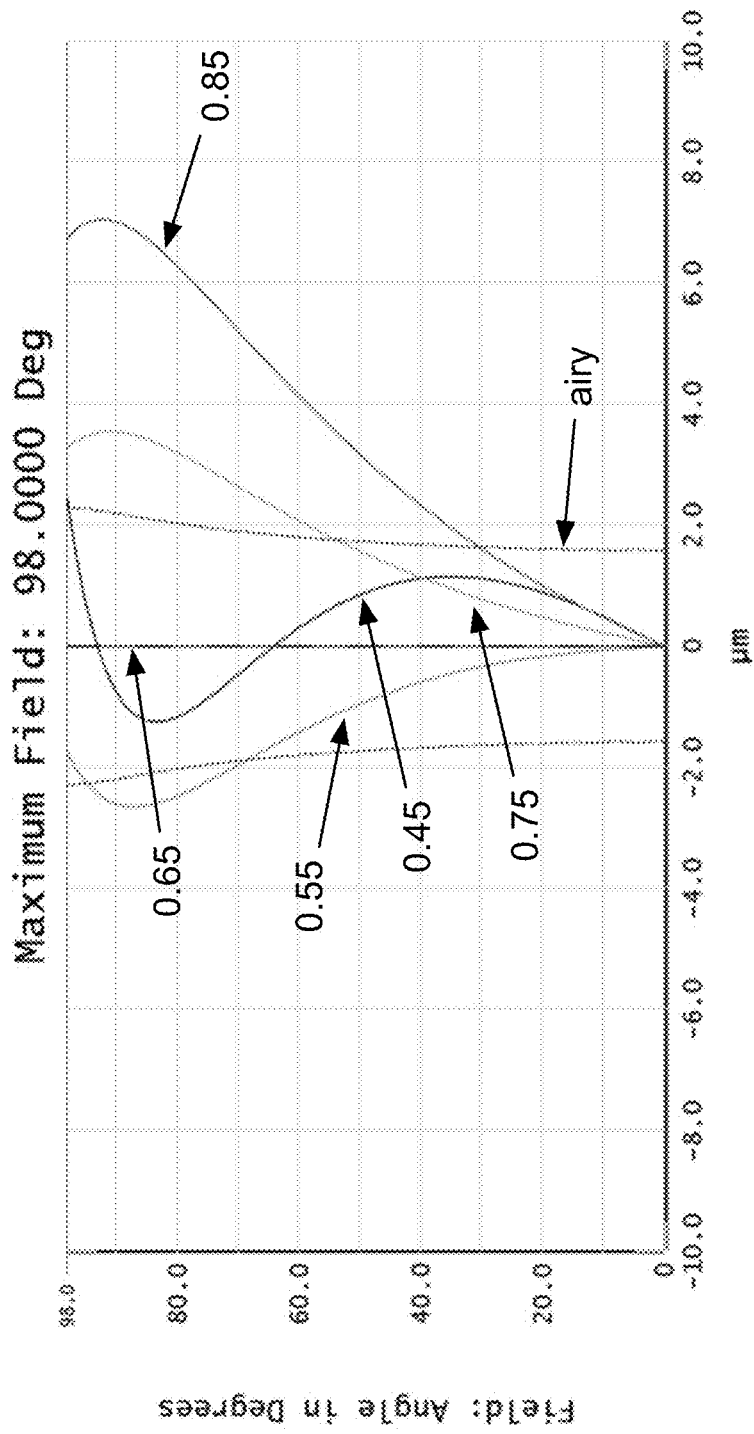
FIG. 5B is a diagram of the lateral color correction of the lens of FIG. 1A.

FIG. 5B shows the lateral color correction. The color correction is shown for various wavelengths of light, as a function of field angle, for the lens 500 of FIG. 5A. The format of FIG. 5B is the same as for FIG. 1B. Each line is labeled with the wavelength of the light for the color correction, or, is the Airy line as are known in the art.

Figure 6A:
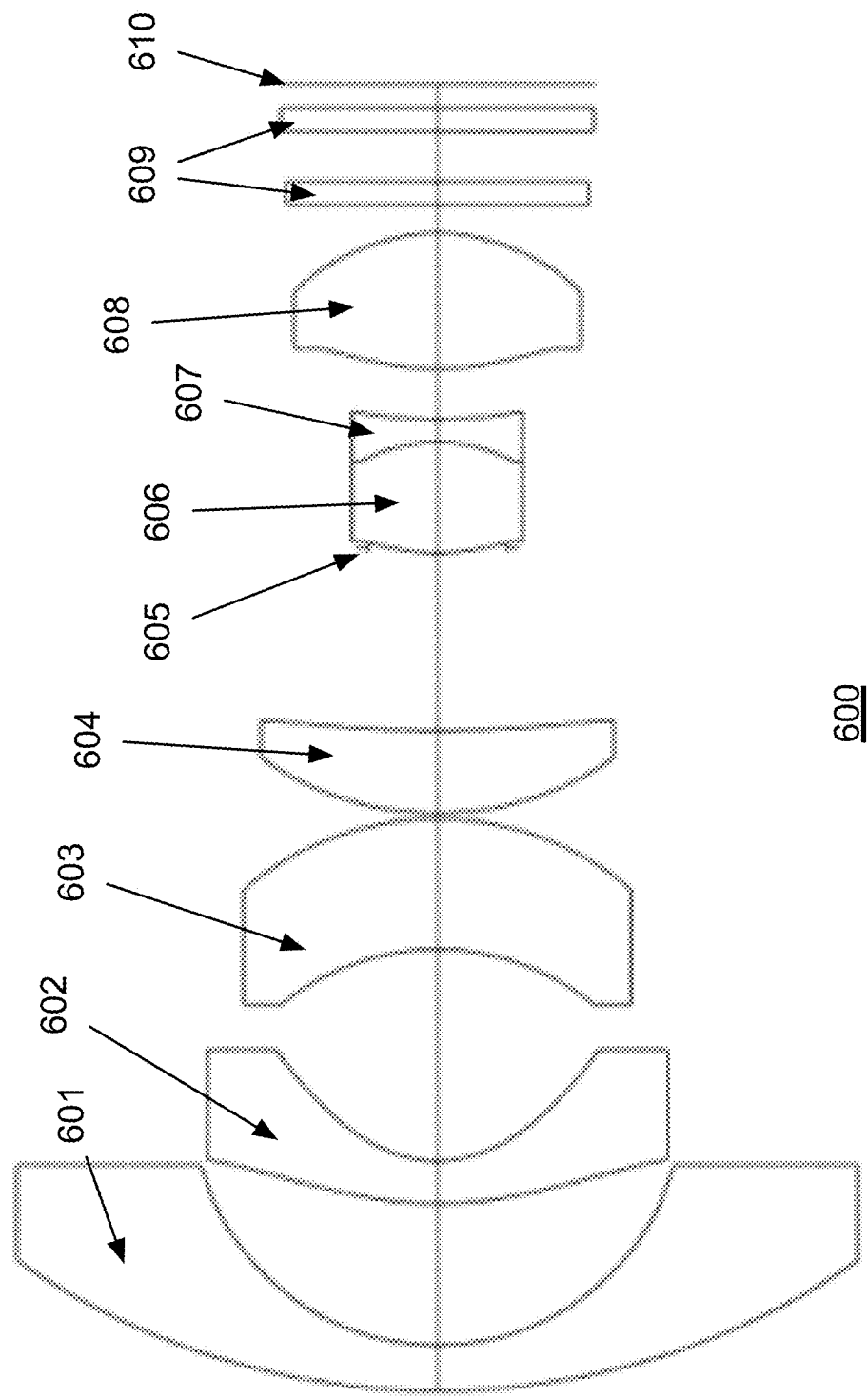
FIG. 6A is a first example embodiment of a wide-angle hyperspectral lens according to the present invention.

FIG. 6A shows a cross-section view of a sixth embodiment of a wide-angle hyperspectral lens. The lens 600 is comprised, from object to image, of three lens groups each symmetrical about the optical axis and distributed along the

TABLE 5A

Optical Prescription for the lens of FIG. 5A.

| Surf | Type | Radius | Thickness | Nd, Vd | Elements of FIG. 4A |
|---|---|---|---|---|---|
| OBJ | STANDARD | Infinity | Infinity | | |
| 1 | STANDARD | 10.06564 | 0.8 | 2.000689, 25.435062 | 501 |
| 2 | STANDARD | 4.489335 | 2.306846 | | |
| 3 | EVENASPH | 8.252423 | 0.75 | 1.910826, 35.255728 | 502 |
| 4 | EVENASPH | 2.409996 | 3.294256 | | |
| 5 | STANDARD | −4.59743 | 3.620805 | 1.953749, 32.318108 | 503 |
| 6 | STANDARD | −5.76908 | 0.098599 | | |
| 7 | STANDARD | 4.063608 | 1.566447 | 1.717361, 29.509994 | 504 |
| 8 | STANDARD | 7.93144 | 1.952333 | | |
| STO | STANDARD | Infinity | 0.093659 | | 505 |
| 10 | STANDARD | 3.276817 | 2.199508 | 1.496998, 81.594687 | 506 |
| 11 | STANDARD | −2.5326 | 0.393104 | 1.922866, 20.882149 | 507 |
| 12 | STANDARD | 13.22043 | 0.766349 | | |
| 13 | EVENASPH | 4.179753 | 2.445773 | 1.497103, 81.559580 | 508 |
| 14 | EVENASPH | −3.07023 | 0.5 | | |
| 15 | STANDARD | Infinity | 0.4 | 1.516797, 64.212351 | 509 |
| 16 | STANDARD | Infinity | 0.986503 | | |
| 17 | STANDARD | Infinity | 0.4 | 1.516800, 64.167336 | 509 |
| 18 | STANDARD | Infinity | 0.4296 | | |
| IMA | STANDARD | Infinity | | | 510 |

Both surfaces of lens element 502 in the first group, and lens element 508 in the third group are aspherical, described by Equation 1. The aspherical coefficients of these surfaces are described by Table 5B.

optical axis. The lens has a total track length (TTL) and a semi-clear aperture. Note individual surfaces, the optical axis, total track length and clear aperture are not labeled but equivalent to those elements labeled in FIG. 1A.

Group 1 has negative power and comprises two negative power lens elements 601, 602. The first element 601 has a meniscus shape and a convex object surface. The second lens element 602 has negative power and a concave image surface. In this embodiment, both surfaces of the second lens element 602 are aspherical.

Group 2 has positive power and is comprised of two positive power lens elements 603, 604. The first lens element 603 of group 2 has a concave object surface and a convex image surface. The second lens element 604 of group 2 has a convex object surface and a concave image surface. An aperture stop 605 is located between the second lens group 603, 604 and the third lens group 606-608.

The third lens group has positive power comprising a cemented doublet 606, 607 and a singlet element 608. The first element 606 of the doublet and the singlet 608 are both formed from an optical material having a negative do/dT coefficient. Both surfaces of the single lens element 608 are aspherical. The figure further shows optional filters and protective covers 609 before the imaging sensor 610.

The lens 600 has a field angle of +/−98°, and a relative aperture of F/2. The value for TTL/D of this lens is 3.1.

The optical prescription details of the lens 600 are shown in Tables 6A and 6B. Explanations of the values included in the tables are the same as already described.

TABLE 6A

Optical Prescription for the lens of FIG. 6A.

| Surf | Type | Radius | Thickness | Vd, Nd | Elements of FIG. 6A |
|---|---|---|---|---|---|
| 1 | STANDARD | 13.08148 | 0.8 | 1.910826, 35.255728 | 601 |
| 2 | STANDARD | 4.322599 | 2.497895 | | |
| 3 | EVENASPH | 6.639103 | 0.75 | 1.774002, 49.604291 | 602 |
| 4 | EVENASPH | 2.153874 | 3.72019 | | |
| 5 | STANDARD | −4.38791 | 2.295293 | 1.953749, 32.318108 | 603 |
| 6 | STANDARD | −5.30442 | 0.1 | | |
| 7 | STANDARD | 5.412032 | 1.465705 | 1.806105, 41.023451 | 604 |
| 8 | STANDARD | 25.2619 | 3.207046 | | |
| STO | STANDARD | Infinity | −0.083 | | 605 |
| 10 | STANDARD | 4.147682 | 1.945783 | 1.592824, 68.624378 | 606 |
| 11 | STANDARD | −2.80695 | 0.4 | 1.846666, 23.787324 | 607 |
| 12 | STANDARD | 8.129265 | 0.884867 | | |
| 13 | EVENASPH | 4.343701 | 2.395432 | 1.497103, 81.559580 | 608 |
| 14 | EVENASPH | −3.11457 | 0.5 | | |
| 15 | STANDARD | Infinity | 0.4 | 1.516797, 64.212351 | 609 |
| 16 | STANDARD | Infinity | 0.897652 | | |
| 17 | STANDARD | Infinity | 0.4 | 1.516800, 64.167336 | 609 |
| 18 | STANDARD | Infinity | 0.4296 | | |
| IMA | STANDARD | Infinity | | | 610 |

Both surfaces of lens element 602 in the first group, and lens element 608 in the third group are aspherical, described by Equation 1. The aspherical coefficients of these surfaces are described by Table 6B.

TABLE 6B

Aspheric Coefficients for Lens of FIG. 6A

| Surface 3, Object Surface of Lens Element 602 | | Surface 4, Image Surface of lens Element 602 |
|---|---|---|
| Coefficient | | |
| $\alpha_1$ | 0 | 0 |
| $\alpha_2$ | −0.0023121227 | 0.0010824132 |
| $\alpha_3$ | 4.8396168e−06 | 0 |
| $\alpha_4$ | 0 | 0 |
| $\alpha_5$ | 0 | 0 |
| $\alpha_6$ | 0 | 0 |

TABLE 6B-continued

Aspheric Coefficients for Lens of FIG. 6A

| $\alpha_7$ | 0 | 0 |
|---|---|---|
| $\alpha_8$ | 0 | 0 |

| Surface 13, Object Surface of Lens Element 608 | | Surface 14, Image Surface of lens Element 608 |
|---|---|---|
| Coefficient | | |
| $\alpha_1$ | 0 | 0 |
| $\alpha_2$ | −0.0092189507 | 0.0079432792 |
| $\alpha_3$ | 0.00052385206 | −0.00036083036 |
| $\alpha_4$ | −0.00012347921 | 3.1769033e−05 |
| $\alpha_5$ | 0 | −3.7573664e−06 |
| $\alpha_6$ | 0 | 0 |
| $\alpha_7$ | 0 | 0 |
| $\alpha_8$ | 0 | 0 |

Figure 6B:
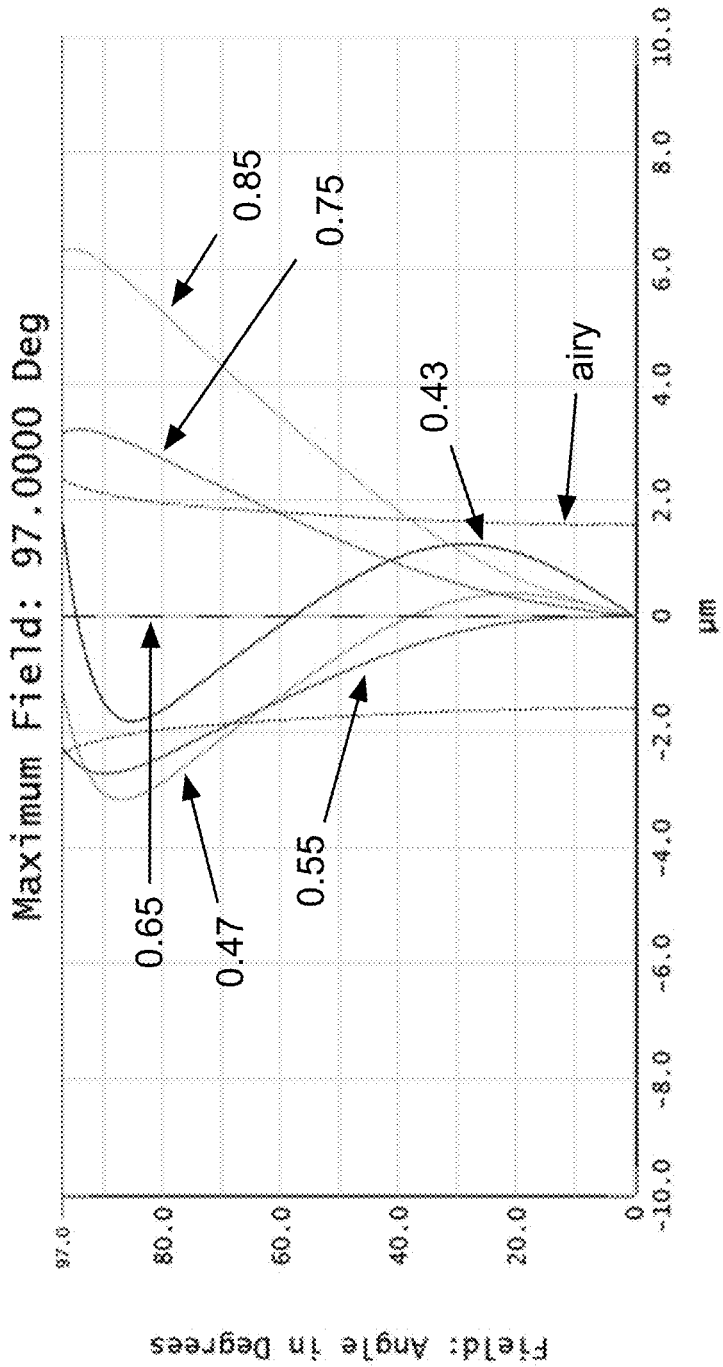
FIG. 6B is a diagram of the lateral color correction of the lens of FIG. 1A.

FIG. 6B shows the lateral color correction. The color correction is shown for various wavelengths of light, as a function of field angle, for the lens 600 of FIG. 6A. The format of FIG. 6B is the same as for FIG. 1B. Each line is labeled with the wavelength of the light for the color correction, or, is the Airy line as are known in the art.

Figure 7A:
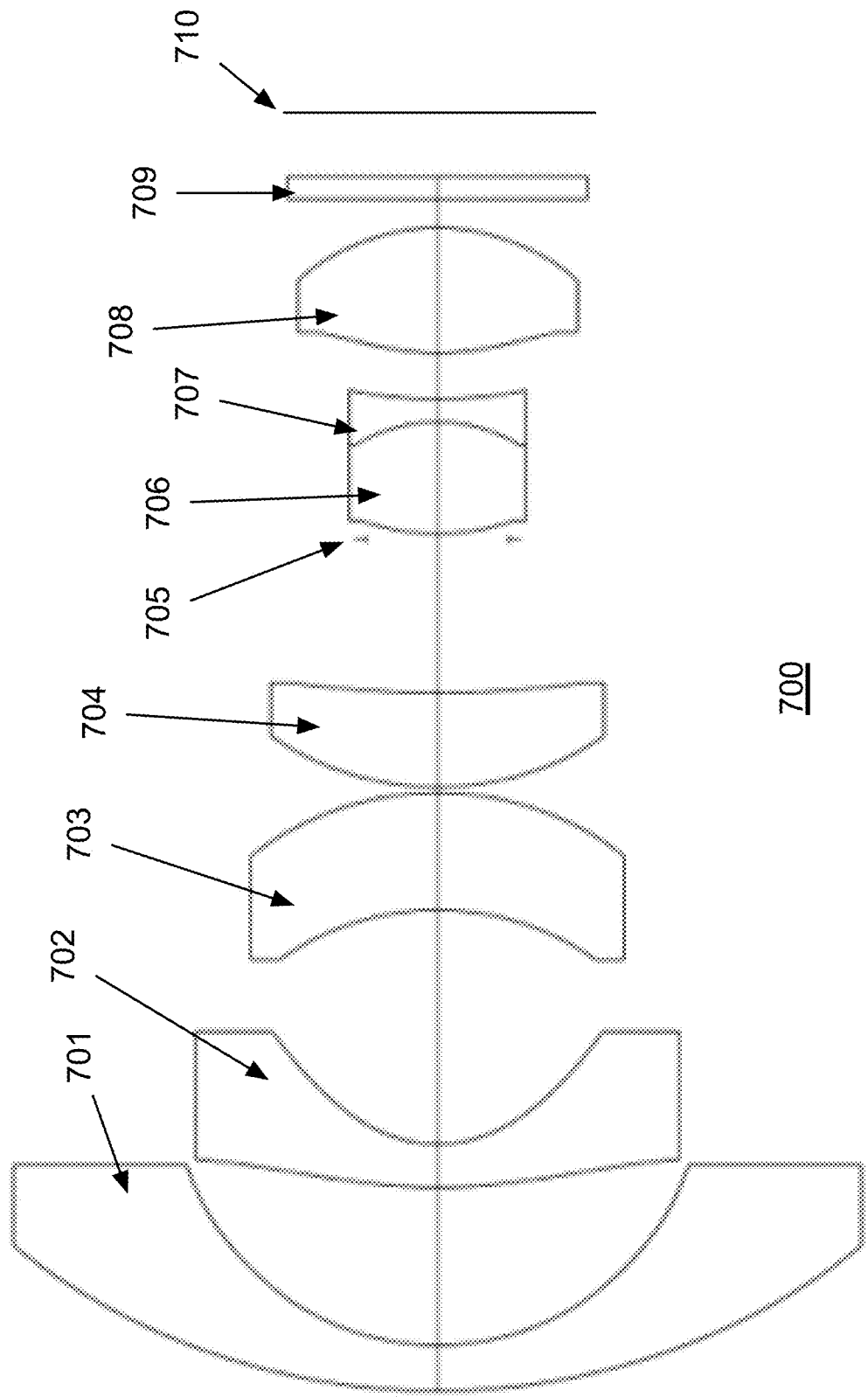
FIG. 7A is a first example embodiment of a wide-angle hyperspectral lens according to the present invention.

FIG. 7A shows a cross-section view of a seventh embodiment of a wide-angle hyperspectral lens. The lens 700 is comprised, from object to image, of three lens groups each symmetrical about the optical axis and distributed along the optical axis. The lens has a total track length (TTL) and a semi-clear aperture. Note individual surfaces, the optical axis, total track length and clear aperture are not labeled but equivalent to those elements labeled in FIG. 1A.

Group 1 has negative power and comprises two negative power lens elements 701, 702. The first element 701 has a meniscus shape and a convex object surface. The second lens element 702 has negative power and a concave image surface. In this embodiment, both surfaces of the second lens element 702 are aspherical.

Group 2 has positive power and is comprised of two positive power lens elements 703, 704. The first lens element 703 of group 2 has a concave object surface and a convex image surface. The second lens element 704 of group 2 has a convex object surface and a concave image surface. An aperture stop 705 is located between the second lens group 703, 704 and the third lens group 706-708.

The third lens group has positive power comprising a cemented doublet 706, 707 and a singlet element 708. The first element 706 of the doublet and the singlet 708 are both formed from an optical material having a negative do/dT coefficient. Both surfaces of the single lens element 708 are aspherical. The figure further shows optional filters and protective covers 709 before the imaging sensor 710.

The lens 700 has a field angle of +/−97°, and a relative aperture of F/2. The value for TTL/D of this lens is 3.1.

The optical prescription details of the lens 700 are shown in Tables 7A and 7B. Explanations of the values included in the tables are the same as already described.

TABLE 7A

Optical Prescription for the lens of FIG. 7A.

| Surf | Type | Radius | Thickness | Nd, Vd | Element of FIG. 7A |
|---|---|---|---|---|---|
| 1 | STANDARD | 12.10231 | 0.8 | 1.910826, 35.255728 | 701 |
| 2 | STANDARD | 4.635784 | 2.761799 | | |
| 3 | EVENASPH | 9.816681 | 0.75 | 1.774002, 49.604291 | 702 |
| 4 | EVENASPH | 2.279818 | 4.090217 | | |
| 5 | STANDARD | −4.82886 | 2.048602 | 1.953749, 32.318108 | 703 |
| 6 | STANDARD | −5.36036 | 0.1 | | |
| 7 | STANDARD | 5.1998 | 1.648473 | 1.806105, 41.023451 | 704 |
| 8 | STANDARD | 18.91501 | 2.677272 | | |
| STO | STANDARD | Infinity | 0.099956 | | 705 |
| 10 | STANDARD | 4.039676 | 1.949657 | 1.592824, 68.624378 | 706 |
| 11 | STANDARD | −2.77396 | 0.4 | 1.846666, 23.787324 | 707 |
| 12 | STANDARD | 7.871806 | 0.806227 | | |
| 13 | EVENASPH | 4.272119 | 2.190803 | 1.497103, 81.559580 | 708 |
| 14 | EVENASPH | −3.36299 | 0.5 | | |
| 15 | STANDARD | Infinity | 0.4 | 1.516797, 64.212351 | 709 |
| 16 | STANDARD | Infinity | 0.949295 | | |
| 17 | STANDARD | Infinity | 0.4 | 1.516800, 64.167336 | 709 |
| 18 | STANDARD | Infinity | 0.4296 | | |
| IMA | STANDARD | Infinity | | | 710 |

Both surfaces of lens element 702 in the first group, and lens element 708 in the third group are aspherical, described by Equation 1. The aspherical coefficients of these surfaces are described by Table 7B.

TABLE 7B

Aspheric Coefficients for Lens of FIG. 7A

| Surface 3, Object Surface of Lens Element 702 | | Surface 4, Image Surface of lens Element 702 |
|---|---|---|
| Coefficient | | |
| $\alpha_1$ | 0 | 0 |
| $\alpha_2$ | −0.0018006341 | 0.0020687391 |
| $\alpha_3$ | 1.8546316e-05 | 0 |
| $\alpha_4$ | 0 | 0 |
| $\alpha_5$ | 0 | 0 |
| $\alpha_6$ | 0 | 0 |
| $\alpha_7$ | 0 | 0 |
| $\alpha_8$ | 0 | 0 |

| Surface 13, Object Surface of Lens Element 708 | | Surface 14, Image Surface of lens Element 708 |
|---|---|---|
| Coefficient | | |
| $\alpha_1$ | 0 | 0 |
| $\alpha_2$ | −0.0099693724 | 0.0053071422 |
| $\alpha_3$ | 0.00052493913 | −0.00021264916 |
| $\alpha_4$ | −0.00011235555 | 1.4964433e-05 |
| $\alpha_5$ | 0 | −4.8730026e-06 |
| $\alpha_6$ | 0 | 0 |

TABLE 7B-continued

Aspheric Coefficients for Lens of FIG. 7A

| $\alpha_7$ | 0 | 0 |
|---|---|---|
| $\alpha_8$ | 0 | 0 |

Figure 7B:
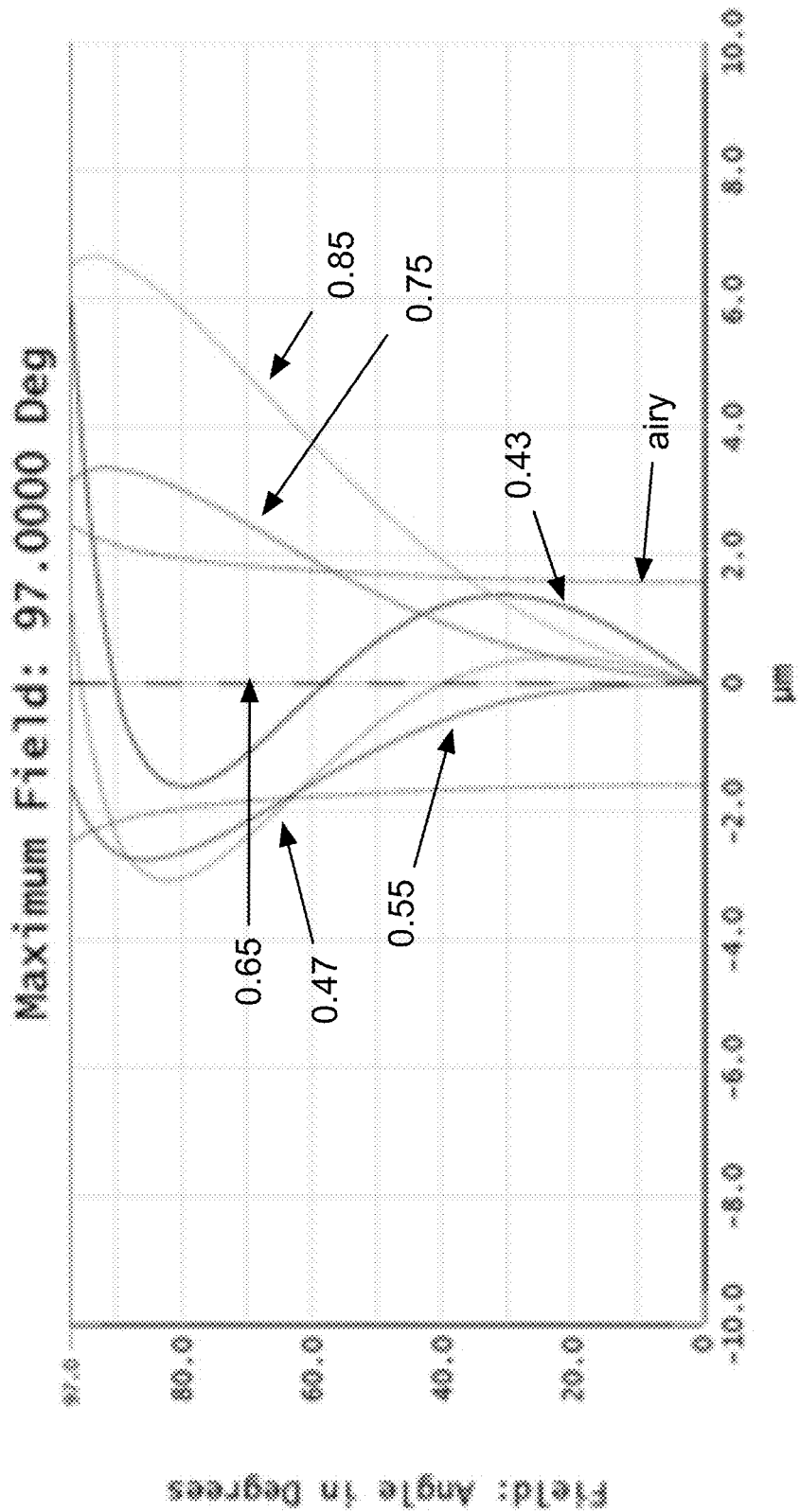
FIG. 7B is a diagram of the lateral color correction of the lens of FIG. 1A.

FIG. 7B shows the lateral color correction. The color correction is shown for various wavelengths of light, as a function of field angle, for the lens 700 of FIG. 7A. The format of FIG. 7B is the same as for FIG. 1B. Each line is labeled with the wavelength of the light for the color correction, or, is the Airy line as are known in the art.

Figure 8A:
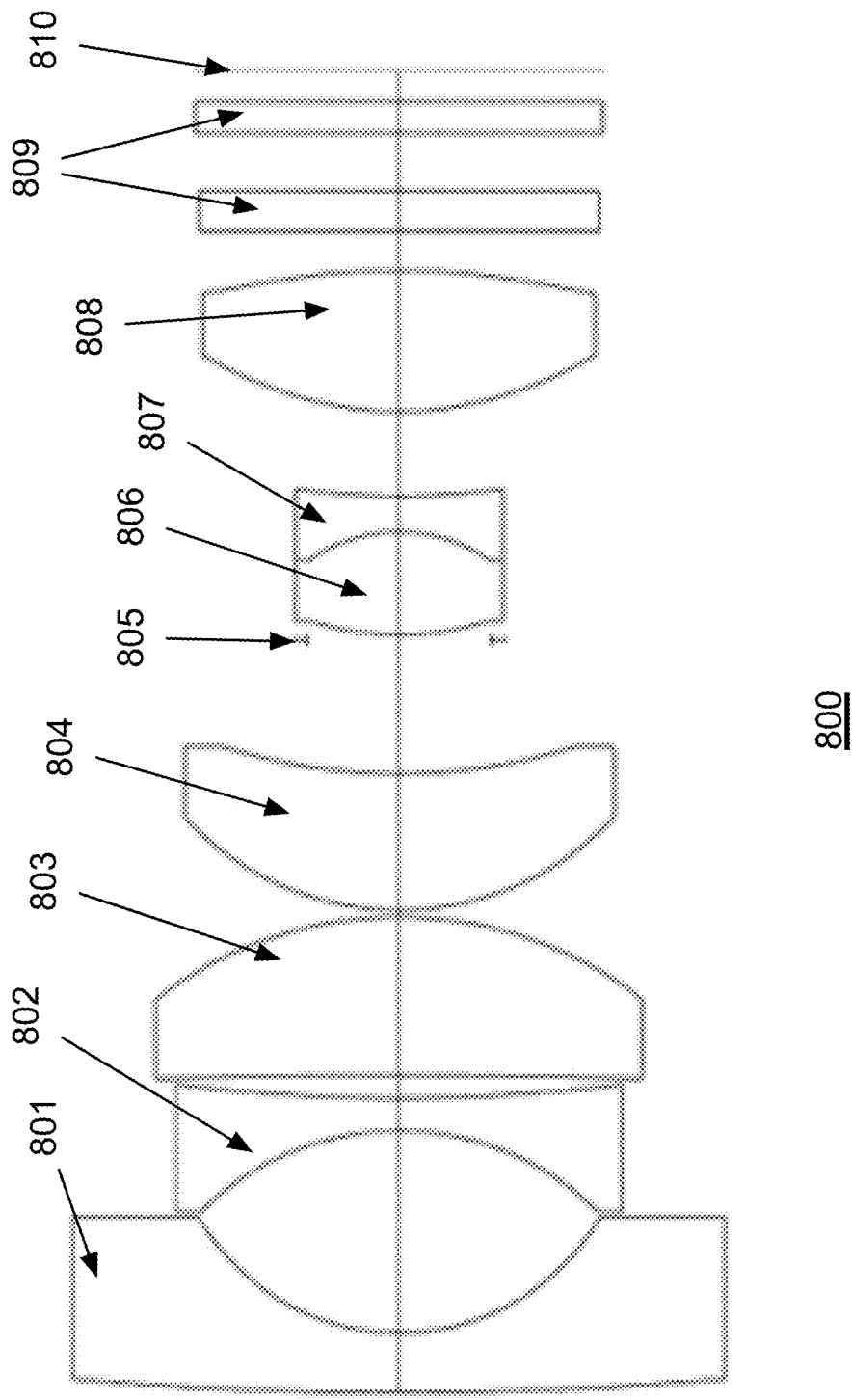
FIG. 8A is a first example embodiment of a wide-angle hyperspectral lens according to the present invention.

FIG. 8A shows a cross-section view of an eighth embodiment of a wide-angle hyperspectral lens. The lens 800 is comprised, from object to image, of three lens groups each symmetrical about the optical axis and distributed along the optical axis. The lens has a total track length (TTL) and a semi-clear aperture. Note individual surfaces, the optical axis, total track length and clear aperture are not labeled but equivalent to those elements labeled in FIG. 1A.

Group 1 has negative power and comprises two negative power lens elements 801, 802. The first element 801 has a meniscus shape and a convex object surface. The second lens element 802 has negative power and a concave image surface. In this embodiment, all surfaces of group 1 are spherical.

Group 2 has positive power and is comprised of two positive power lens elements 803, 804. The first lens element 803 of group 2 has a concave object surface and a convex image surface. The second lens element 804 of group 2 has a convex object surface and a concave image surface. An aperture stop 805 is located between the second lens group 803, 804 and the third lens group 806-808.

The third lens group has positive power comprising a cemented doublet 806, 807 and a singlet element 808. The first element 806 of the doublet is formed from an optical material having a negative do/dT coefficient. Both surfaces of the single lens element 808 are aspherical. The figure further shows optional filters and protective covers 809 before the imaging sensor 810.

The lens 800 has a field angle of +/−80°, and a relative aperture of F/2.1. The value for TTL/D of this lens is 4.1.

The optical prescription details of the lens 800 are shown in Tables 8A and 8B. Explanations of the values included in the tables are the same as already described.

TABLE 8A

Optical Prescription for the lens of FIG. 8A.

| Surf | Type | Radius | Thickness | Nd, Vd | Element of FIG. 8A |
|---|---|---|---|---|---|
| 1 | STANDARD | 48.51387 | 0.75 | 1.805189, 25.477290 | 801 |
| 2 | STANDARD | 2.913425 | 2.542139 | | |
| 3 | STANDARD | −3.56499 | 0.41003 | 1.592824, 68.624378 | 802 |
| 4 | STANDARD | 23.21659 | 0.285732 | | |
| 5 | STANDARD | −106.072 | 1.990305 | 1.774002, 49.604291 | 803 |
| 6 | STANDARD | −5.01782 | 0.08525 | | |
| 7 | STANDARD | 3.699987 | 1.709776 | 1.910826, 35.255728 | 804 |
| 8 | STANDARD | 7.249787 | 1.680685 | | |
| STO | STANDARD | Infinity | 0.067821 | | 805 |
| 10 | STANDARD | 3.705912 | 1.293843 | 1.592824, 68.624378 | 806 |
| 11 | STANDARD | −1.97141 | 0.447431 | 1.846666, 23.787324 | 807 |
| 12 | STANDARD | 9.032643 | 1.062894 | | |
| 13 | EVENASPH | 4.139499 | 1.770446 | 1.608858, 57.965801 | 808 |
| 14 | EVENASPH | −9.27378 | 0.5 | | |
| 15 | STANDARD | Infinity | 0.5 | 1.516797, 64.212351 | 809 |
| 16 | STANDARD | Infinity | 0.724835 | | |
| 17 | STANDARD | Infinity | 0.4 | 1.516800, 64.167336 | 809 |
| 18 | STANDARD | Infinity | 0.4 | | |
| IMA | STANDARD | Infinity | | | 810 |

Both surfaces of the single lens element 808 in the third group are aspherical. All aspherical surfaces are described by Equation 1. The aspherical coefficients of these surfaces are described by Table 8B.

TABLE 8B

Aspheric Coefficients for Lens of FIG. 8A

| Coefficient | Surface 13, Object Surface of Lens Element 808 | Surface 14, Image Surface of lens Element 808 |
|---|---|---|
| $\alpha_1$ | 0 | 0 |
| $\alpha_2$ | −0.0041761955 | 0.00054088788 |
| $\alpha_3$ | 0.00025512961 | −0.00013771006 |
| $\alpha_4$ | 0 | 4.3509001e−05 |
| $\alpha_5$ | 0 | 0 |
| $\alpha_6$ | 0 | 0 |
| $\alpha_7$ | 0 | 0 |
| $\alpha_8$ | 0 | 0 |

Figure 8B:
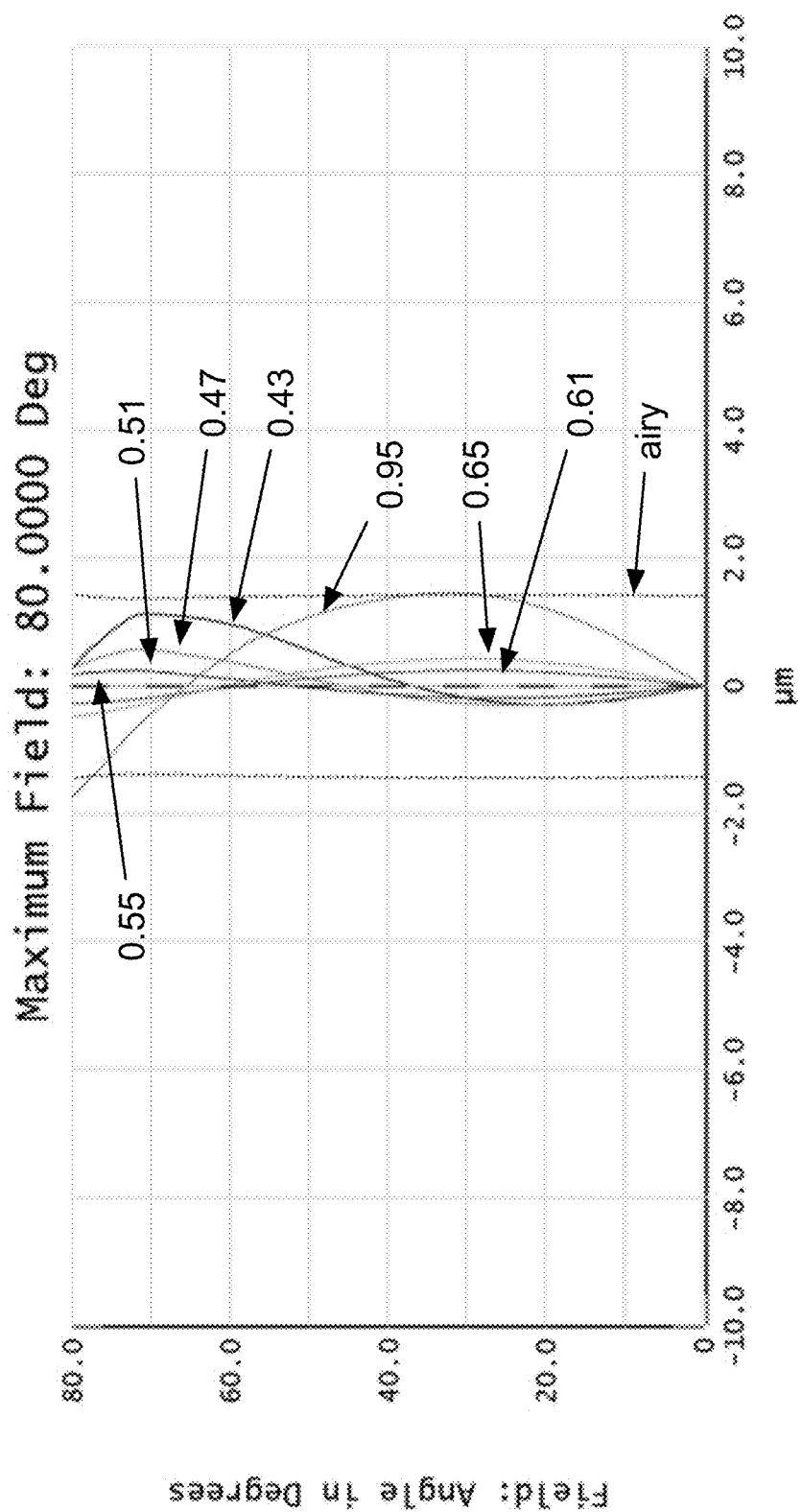
FIG. 8B is a diagram of the lateral color correction of the lens of FIG. 1A.

FIG. 8B shows the lateral color correction. The color correction is shown for various wavelengths of light, as a function of field angle, for the lens 800 of FIG. 8A. The format of FIG. 8B is the same as for FIG. 1B. Each line is labeled with the wavelength of the light for the color correction, or, is the Airy line as are known in the art.

SUMMARY

Wide-angle optical imaging lenses designed to have a wide field of view, stability in optical properties over temperature excursions and low chromatic aberrations are described. The lenses are described through eight examples all having common properties of design and minimum performance. A summary of parameters for all eight examples is shown in Tables 9A and 9B.

TABLE 9A summary of properties for Examples 1-4

| | Example 1 | Example 2 | Example 3 | Example 4 |
|---|---|---|---|---|
| Value of key parameters | | | | |
| Field Angle | +30/−75° | +30/−75° | +30/−80° | +30/−83° |
| D, First element semi-clear aperture | 6.77 | 6.42 | 5.14 | 5.52 |
| TTL | 24 | 24 | 16.5 | 20 |
| F | 2.55 | 2.53 | 2.13 | 2.3 |
| F1 | −2.95 | −2.678 | −2.56 | −2.2 |
| F2 | 4.79 | 6.29 | 4.4 | 3.7883 |
| F3 | 9.724 | 6.77 | 4.86 | 8.06 |
| Ratios | | | | |
| TTL/D | 3.55 | 3.74 | 3.21 | 3.62 |
| TTL/F | 9.4 | 9.5 | 7.7 | 8.7 |
| TTL/F1 | −8.1 | −9.0 | −6.4 | −9.1 |
| TTL/F2 | 5.0 | 3.8 | 3.8 | 5.3 |
| TTL/F3 | 2.5 | 3.5 | 3.4 | 2.5 |
| F1/F | −1.16 | −1.06 | −1.20 | −0.96 |
| F2/F | 1.88 | 2.49 | 2.07 | 1.65 |
| F3/F | 3.81 | 2.68 | 2.28 | 3.50 |
| F3/F1 | −3.30 | −2.53 | −1.90 | −3.66 |
| F3/F2 | 2.03 | 1.08 | 1.10 | 2.13 |

TABLE 9B summary of properties for Examples 5-8

| | Example 5 | Example 6 | Example 7 | Example 8 |
|---|---|---|---|---|
| Value of key parameters | | | | |
| Field Angle | +30/−98° | +30/−98° | +30/−97° | +30/−80° |
| D, First element semi-clear aperture | 7.39 | 7.394 | 7.4 | 4.1 |
| TTL | 23 | 23 | 23 | 16.62 |
| F | 1.44 | 1.4 | 1.41 | 2.488 |
| F1 | −2.3 | −2.21 | −2.2 | −1.72 |
| F2 | 6.24 | 6.198 | 6.18 | 3.1856 |
| F3 | 5.69 | 5.3 | 5.47 | 6.7 |

TABLE 9B-continued summary of properties for Examples 5-8

| Ratios | Example 5 | Example 6 | Example 7 | Example 8 |
|---|---|---|---|---|
| TTL/D | 3.11 | 3.11 | 3.11 | 4.05 |
| TTL/F | 16.0 | 16.4 | 16.3 | 6.7 |
| TTL/F1 | −10.0 | −10.4 | −10.5 | −9.7 |
| TTL/F2 | 3.7 | 3.7 | 3.7 | 5.2 |
| TTL/F3 | 4.0 | 4.3 | 4.2 | 2.5 |
| F1/F | −1.60 | −1.58 | −1.56 | −0.69 |
| F2/F | 4.33 | 4.43 | 4.38 | 1.28 |
| F3/F | 3.95 | 3.79 | 3.88 | 2.69 |
| F3/F1 | −2.47 | −2.40 | −2.49 | −3.90 |
| F3/F2 | 0.91 | 0.86 | 0.89 | 2.10 |

I claim:

1. A wide-angle lens comprising, from object to image:
    a) a $1^{st}$ lens group comprising two negatively powered elements where the first negative element is a meniscus lens with a convex object surface, and the second negative lens element has a concave image surface, and,
    b) a $2^{nd}$ lens group with positive power comprising two elements each with positive power where the first element has a concave object surface and convex image surface and the second element has a convex object surface and a convex image surface, and,
    c) an aperture stop, and,
    d) a $3^{rd}$ lens group with positive power comprising a cemented doublet or a cemented triplet element, including a positive lens element in the cemented doublet or the cemented triplet, and, a singlet element.

2. The wide-angle lens of claim 1 where the second element of the first group is aspheric.

3. The wide-angle lens of claim 2 where the object surface and the image surface of the second element of the first group are aspherical.

4. The wide-angle lens of claim 1 wherein the singlet element of the third group is aspheric.

5. The wide-angle lens of claim 4 where the object surface and the image surface of the singlet element of the third group are aspherical.

6. The wide-angle lens of claim 1 where the positive element of the cemented doublet or triplet in the third lens group is made from material having a negative value for dn/dT, where do is an incremental change in refractive index of the lens material for a given incremental change in temperature, dT.

7. The wide-angle lens of claim 1 wherein the field angle is ≥+/−75°.

8. The wide-angle lens of claim 1 where the singlet element of the third lens group is made from material having a negative value for dn/dT, where dn is an incremental change in refractive index of the lens material for a given incremental change in temperature, dT.

9. The wide-angle lens of claim 1 where TTL/D is less than or equal to 4.1, where TTL is the total track length of the wide-angle lens and D is the clear aperture of the first lens element of the first lens group.

10. A wide-angle lens consisting of, from object to image:
    a) a $1^{st}$ lens group consisting of two negatively powered elements where the first negative element is a meniscus lens with a convex object surface, and the second negative lens element has a concave image surface, and,
    b) a $2^{nd}$ lens group with positive power consisting of two elements where the first element has a concave object surface and convex image surface and the second element has a convex object surface and a convex image surface, and,
    c) an aperture stop, and,
    d) a $3^{rd}$ lens group with positive power consisting of a cemented doublet or a cemented triplet element, including a positive lens element in the cemented doublet or the cemented triplet, and, a singlet element.

11. The wide-angle lens of claim 10 where the second element of the first group is aspheric.

12. The wide-angle lens of claim 11 where the object surface and the image surface of the second element of the first group are aspherical.

13. The wide-angle lens of claim 10 wherein the singlet element of the third group is aspheric.

14. The wide-angle lens of claim 13 where the object surface and the image surface of the singlet element of the third group are aspherical.

15. The wide-angle lens of claim 10 where the positive element of the cemented doublet or triplet in the third lens group is made from material having a negative value for do/dT, where do is an incremental change in refractive index of the lens material for a given incremental change in temperature, d-T.

16. The wide-angle lens of claim 10 wherein the field angle is >+/−75°.

17. The wide-angle lens of claim 10 where the singlet element of the third lens group is made from material having a negative value for dn/dT, where dn is an incremental change in refractive index of the lens material for a given incremental change in temperature, dT.

18. The wide-angle lens of claim 10 where TTL/D is less than or equal to 4.1, where TTL is the total track length of the wide-angle lens and D is the clear aperture of the first lens element of the first lens group.

\* \* \* \* \*